United States Patent
Guskov et al.

(10) Patent No.: US 10,947,636 B2
(45) Date of Patent: Mar. 16, 2021

(54) ADJUSTABLE AC/DC CONVERSION TOPOLOGY TO REGULATE AN ISOLATED DC LOAD WITH LOW AC RIPPLE

(71) Applicant: Rockwell Automation Technologies, Inc., Mayfield Heights, OH (US)

(72) Inventors: Nickolay N. Guskov, Mequon, WI (US); Gary L. Skibinski, Milwaukee, WI (US); Zhijun Liu, Colgate, WI (US); William Jonn Sarver, Oakland, MI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 355 days.

(21) Appl. No.: 15/465,110

(22) Filed: Mar. 21, 2017

(65) Prior Publication Data

US 2018/0274122 A1   Sep. 27, 2018

(51) Int. Cl.
*C25D 21/12*   (2006.01)
*H02M 3/335*   (2006.01)
(Continued)

(52) U.S. Cl.
CPC ............. *C25D 21/12* (2013.01); *C25D 17/00* (2013.01); *C25D 17/02* (2013.01); *H02M 1/14* (2013.01);
(Continued)

(58) Field of Classification Search
CPC .... C25D 21/12; C25D 17/005; C25D 17/007; H02M 1/10–2001/348; H02M 1/14;
(Continued)

(56) References Cited

U.S. PATENT DOCUMENTS

| 6,198,647 B1 | 3/2001 | Zhou et al. |
| 6,208,537 B1 | 3/2001 | Skibinski et al. |

(Continued)

FOREIGN PATENT DOCUMENTS

| WO | WO 0233150 | 4/2002 |
| WO | WO 03038159 | 5/2003 |
| WO | WO 2004041628 | 5/2004 |

OTHER PUBLICATIONS

Chinese Office Action dated Apr. 28, 2020 of corresponding Chinese Patent Application No. 201810204181.8. (With English translation).
(Continued)

*Primary Examiner* — Alexander W Keeling
(74) *Attorney, Agent, or Firm* — Fay Sharpe LLP

(57) ABSTRACT

Electroplating and painting systems, methods and power converters are disclosed to provide regulated individual DC output signals to anode structures distributed in a plating solution in a tank to promote formation of plating material on a workpiece using a PWM inverter to generate a first AC signal, a sinewave filter to provide a filtered AC signal, a multiphase isolation transformer to provide a plurality of isolated AC signals, a multi-pulse diode bridge rectifier to provide a DC rectifier output signal, an output filter to provide a filtered DC rectifier output signal, and a blocking diode to provide the filtered DC rectifier output signal to the corresponding tank anode structure.

20 Claims, 20 Drawing Sheets

(51) Int. Cl.
    *H02M 7/06*      (2006.01)
    *C25D 17/00*     (2006.01)
    *H02M 1/14*      (2006.01)
    *C25D 17/02*     (2006.01)
    *H02M 1/34*      (2007.01)
    *H02M 7/5387*    (2007.01)
    *H02M 1/00*      (2006.01)

(52) U.S. Cl.
    CPC ....... *H02M 3/335* (2013.01); *H02M 3/33507* (2013.01); *H02M 7/06* (2013.01); *H02M 7/5387* (2013.01); *H02M 2001/007* (2013.01); *H02M 2001/348* (2013.01)

(58) Field of Classification Search
    CPC ...... H02M 3/335; H02M 3/3357; H02M 7/06; H02M 7/5387; H02M 2001/007
    See application file for complete search history.

(56) References Cited

U.S. PATENT DOCUMENTS

| | | | |
|---|---|---|---|
| 6,335,872 B1 | 1/2002 | Zhou et al. | |
| 6,549,434 B2 | 4/2003 | Zhou et al. | |
| 7,626,836 B2 | 12/2009 | Leggate et al. | |
| 8,299,732 B2 | 10/2012 | Hoadley et al. | |
| 2002/0070117 A1* | 6/2002 | Gutierrez, Jr. | C25D 5/18 205/80 |
| 2004/0245093 A1* | 12/2004 | Hubel | C25D 17/28 204/198 |
| 2011/0051467 A1 | 3/2011 | Nakanishi | |
| 2014/0217964 A1 | 8/2014 | Fujimoto et al. | |

OTHER PUBLICATIONS

European Office Action dated Jun. 10, 2020 of corresponding European Patent Application No. 18 162 163.2-1201.
Chinese Office Action dated Sep. 29, 2020 of corresponding Chinese Patent Application No. 201810204181.8. (With English translation).
Xiaojun Zhanyou Sha et al., "Overview on Switching-Mode ower Supply (SMPS)", Optimal Design of Switching Power Supply, First Edition, Jan. 1, 2015 (Jan. 1, 2015), XP055594079, 30 pages.
European Office action for European Application No. 18162163.2-1201 dated Jun. 13, 2019.
Chinese Office Action and Search Report dated Oct. 29, 2019 of corresponding Chinese Patent Application No. 201810204181.8. (With English translation).

* cited by examiner

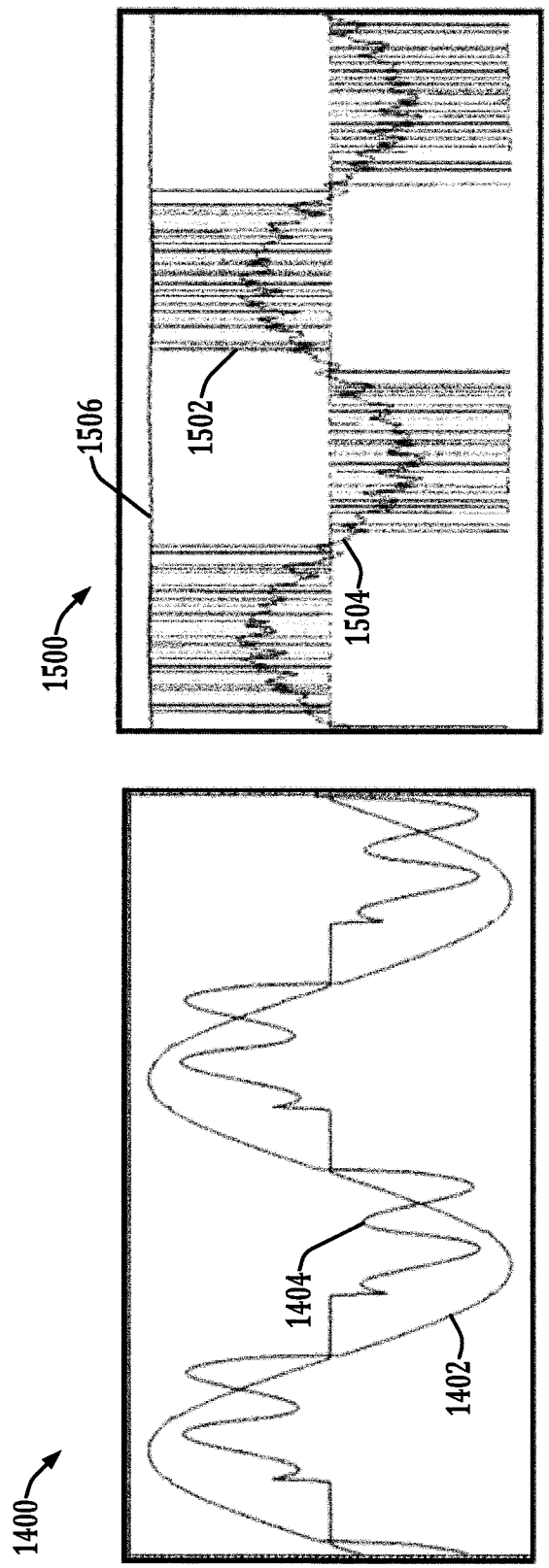

ADJUSTABLE AC/DC CONVERSION TOPOLOGY TO REGULATE AN ISOLATED DC LOAD WITH LOW AC RIPPLE

INCORPORATION BY REFERENCE

The following U.S. patents are hereby incorporated by reference in their entireties: U.S. Pat. No. 6,198,647 to Zhou et al., entitled "Twelve-phase Transformer Configuration", issued Mar. 6, 2001; U.S. Pat. No. 6,335,872 to Zhou et al., entitled "Nine-phase Transformer", issued Jan. 1, 2002; U.S. Pat. No. 7,626,836 to Leggate et al., entitled "Method and apparatus for adjustable voltage/adjustable frequency inverter control" issued Dec. 1, 2009 and U.S. Pat. No. 6,208,537 to Skibinski et al., entitled "Series resonant sine wave output filter and design methodology", issued Mar. 27, 2001; U.S. Pat. No. 6,549,434 to Zhou et al., entitled "Harmonic Mitigating Method and Apparatus", issued Apr. 15, 2003; and U.S. Pat. No. 8,299,732 to Hoadley and Skibinski, entitled "Power Conversion System and Method", issued Oct. 30, 2012.

BACKGROUND INFORMATION

The present disclosure relates to power conversion systems, and more particularly to AC/DC converters.

BRIEF DESCRIPTION

Disclosed examples include AC/DC converters and electroplating or painting systems with modular anode control (MAC) systems to implement an anodic DC electroplating for workpieces and other end use applications. The individual AC/DC MAC converters include a PWM inverter to generate a first AC signal, a sinewave filter to receive the first AC signal and provide a filtered AC signal to a corresponding primary section of a multiphase isolation transformer, a multi-pulse diode bridge rectifier and an output AC ripple filter to generate a DC output signal. The DC signal is coupled through the blocking diode to a corresponding anode positioned in a tank that includes a liquid plating solution. Workpieces are transferred through the liquid plating material in the tank and DC signals from the anodes cause plating of the workpiece surface.

Electroplating and painting methods are disclosed to apply a coating to a workpiece, including moving a workpiece through a plating solution in a tank along a process direction between the entry end and the exit end, providing a regulated DC voltage signal to each of a plurality of tank anode structures distributed in the plating solution along the process direction between the entry end and the exit end of the tank to promote formation of plating material on the workpiece, and generating the individual DC voltage signals according to a profile defining setpoints for the individual power converter modules. The DC signal generation includes, for each tank anode structure, generating a first AC signal at a frequency, for example in a range of about single digit Hz to about 600 Hz or higher using a pulse width modulation (PWM) inverter, filtering the first AC signal to generate a filtered AC signal using a sinewave filter, generating a plurality of isolated AC signals according to the filtered AC signal using a multiphase isolation transformer, rectifying the isolated AC signals to generate a DC rectifier output signal using a multi-pulse diode bridge rectifier, filtering the DC rectifier output signal to generate a filtered DC rectifier output signal using an output filter, and providing the filtered DC rectifier output to the tank anode structure through a blocking diode.

BRIEF DESCRIPTION OF THE DRAWINGS

FIGS. 14-19 are waveform diagrams illustrating power flow in the adjustable AC/DC conversion topology of FIG. 7.

DETAILED DESCRIPTION

Figure 1:
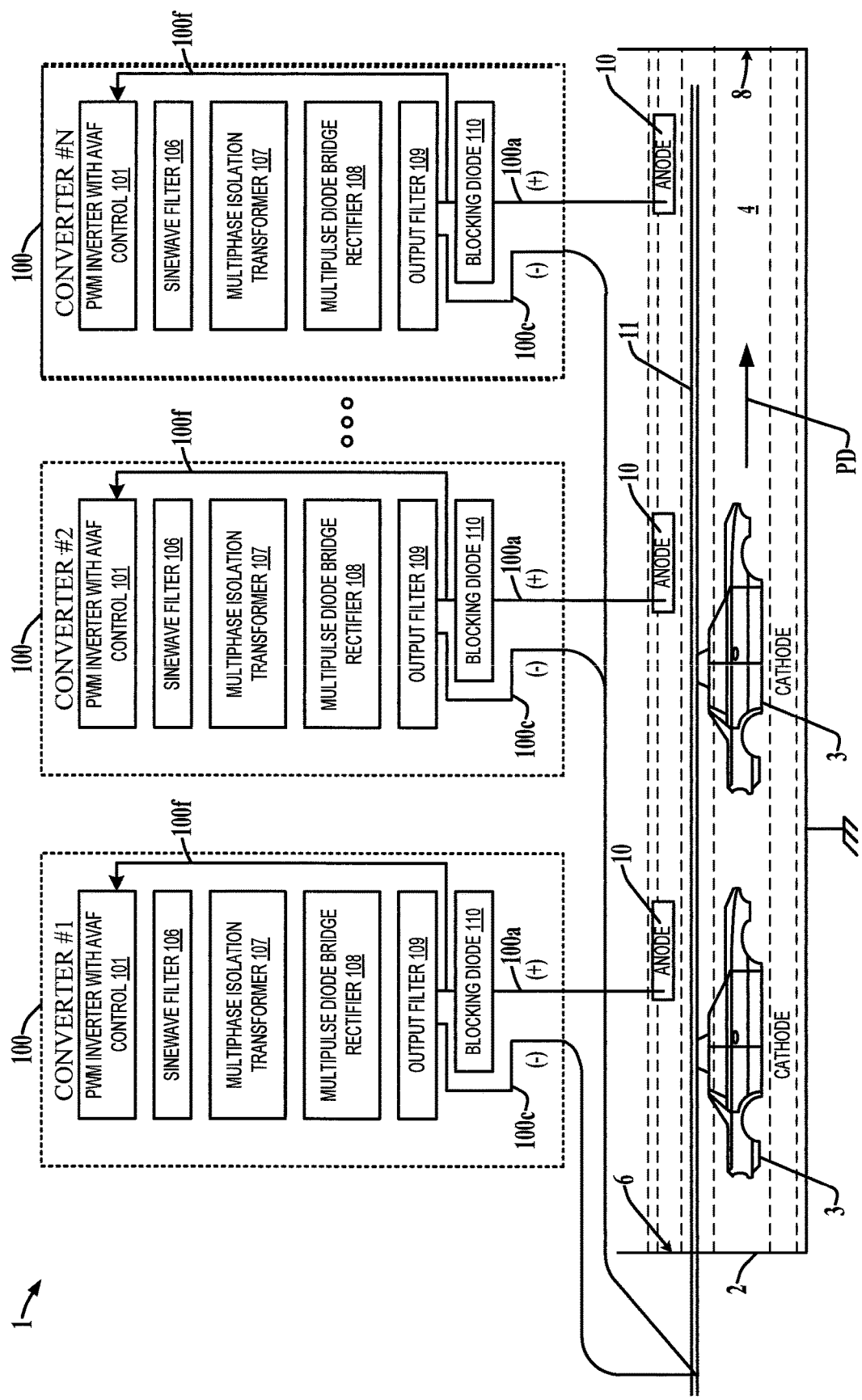
FIG. 1 is a system diagram showing an example electroplating or painting system.

FIG. 1 illustrates an example electroplating system 1 including a plurality of power converters 100 to provide DC output signals with low ripple. Disclosed examples include electroplating systems 1, electroplating methods and power converters 100 to provide individually regulated DC output signals to anode structures 10 distributed in a plating solution 4 in a tank 2 to promote formation of plating material on a workpiece 3. The individual power converters 100 include a PWM inverter 101 to generate a first AC signal, a sinewave filter 106 to provide a filtered AC signal, a multiphase isolation transformer 107 to provide a plurality of isolated AC signals, a multi-pulse diode bridge rectifier 108 to provide a DC rectifier output signal, an output filter 109 to provide a filtered DC rectifier output signal, and a blocking diode 110 to provide the filtered DC rectifier output signal to the corresponding tank anode structure 10. The tank 2 in FIG. 1 is at least partially filled with a plating solution 4. The tank 2 extends along a process direction PD from an entry end 6 to an exit end 8. A plurality of tank anode structures 10 are mounted in distributed fashion along the process direction PD between the ends 6 and 8, and the individual anode structures are disposed in the plating solution 4 in the tank 2. Any suitable integer number N converter modules 100 can be used, corresponding to N anode structures 10 associated with the tank 2. The individual power converter modules 100 include a first output (anode output) 100a (+) and a second output (cathode output) 100c (−) to provide a DC output signal. In particular, the first output 100a provides a DC output signal to a corresponding one of the tank anode structures 10, and the second output 100c in this example is connected to a common cathode electrically coupled to a track or chain 11 from which the automotive vehicle workpieces 3 are suspended in the plating solution 4.

The power converter modules 100 operate according to a profile defining setpoints for the individual power converter modules 100. The individual power converter modules 100 include an adjustable voltage, adjustable frequency pulse width modulation (PWM) inverter 101 to generate a first AC signal. Any suitable single or multiphase AC output signal can be generated by the PWM inverter 101. In one example, the PWM inverter 101 includes a six pulse inverter switching circuit with three pairs of upper and lower switching devices individually coupled between a DC bus node and a corresponding one of three output nodes to provide the first AC signal as a three phase AC signal. In certain examples, moreover, the PWM inverter 101 regulates the filtered DC rectifier output signal by adjusting the first AC signal at least partially according to a feedback signal 100f from the output filter 109. In certain embodiments, the PWM inverter 101 provides the first AC signal at a signal frequency in a range of about single digit Hz to about 600 Hz, for example, in a range of about 180 Hz to about 300 Hz. In one embodiment, the PWM inverter 101 provides the first AC signal at a signal frequency of about 180 Hz.

The individual power modules 100 also include a sinewave filter 106 with an input to receive the first AC signal, and an output to provide a filtered AC signal, as well as a multiphase isolation transformer 107 with a primary winding to receive the filtered AC signal. A multiphase secondary of the isolation transformer 107 provides a plurality of isolated AC signals. The multiphase isolation transformer 107 in one example is a six-phase transformer. In other non-limiting examples, the multiphase isolation transformer 107 is a nine-phase transformer. In addition, the power modules 100 include a multi-pulse diode bridge rectifier 108 having a plurality of rectifier inputs to receive the plurality of isolated AC signals from the isolation transformer 107, and a rectifier output to provide a DC rectifier output signal. An output filter is included, with an input to receive the DC rectifier output signal, and an output to provide a filtered DC rectifier output signal. The power modules 100 also include, a blocking diode 110 for auctioneering between the converters 100 connected to the tank anode structures 10 in the plating solution 4. The individual blocking diodes 110 have an anode connected to the output of the output filter 109, and a cathode connected to the corresponding tank anode structure 4. The blocking diode 110 thus provides the filtered DC rectifier output signal to the corresponding tank anode structure 10 to promote formation of plating material on the workpieces 3 as they travel through the plating solution 4 along the process direction PD in the tank 2.

The present disclosure also provides an electroplating method to apply a coating to a workpiece 3. In one example, the method includes moving a workpiece 3 through a plating solution 4 in a tank 2 along a process direction PD between the entry end 6 and the exit end 8, as well as providing a DC voltage signal to each of a plurality of tank anode structures 10 distributed in the plating solution 4 along the process direction between the entry end and the exit end of the tank 2 to promote formation of plating material on the workpiece 3. The method further includes generating the individual DC voltage signals according to a profile defining setpoints for the individual power converter modules 100. This includes, for each tank anode structure 10, generating a first AC signal at a frequency in a range of about 120 Hz to about 600 Hz using a pulse width modulation PWM inverter 101, filtering the first AC signal to generate a filtered AC signal using a sinewave filter 106, generating a plurality of isolated AC signals according to the filtered AC signal using a multiphase isolation transformer 107, rectifying the isolated AC signals to generate a DC rectifier output signal using a multi-pulse diode bridge rectifier 108, filtering the DC rectifier output signal to generate a filtered DC rectifier output signal using an output filter 109, and providing the filtered DC rectifier output to the tank anode structure 10 through a blocking diode 110.

Disclosed examples provide an AC or DC input power source to deliver a DC output signal to energize the tank anode structures 10. The individual converters 100 provide an adjustable and regulated output DC voltage potential to a load that is totally isolated from the AC line, while facilitating ultra-low AC ripple voltage characteristics to the same DC load. This is particularly advantageous in connection with the disclosed electroplating process, in which AC ripple at the anode structures 10 leads to surface variations in the plating process and corresponding inconsistencies in the deposited thickness of the epoxy or paint on the vehicle workpieces 3.

In certain examples, the system includes a 6-pulse diode bridge input rectifier (e.g., rectifier 301 in FIG. 8 below), which can be connected to an AC line. In other examples, the system directly receives input power from a DC input source, with a follow on connection to a DC link $Ld_{dc}$-$C_{dc}$ filter to derive a fixed DC bus potential to drive a pulse PWM inverter 101. The PWM inverter semiconductors selectively switch the DC bus at a high rate to create an adjustable 3-phase AC voltage at any desired fixed fundamental frequency, for example, up to 600 Hz. The PWM AC voltage is filtered, in one example using an LC ($L_{ac}$-$C_{ac}$) sine wave output filter 106 to recover only the 3-phase fundamental sine wave voltage. The filtered signal is then applied to a multi-phase (e.g., 3 phase to 9 phase or 3 phase to 12 phase) isolation transformer primary of the transformer 107. The secondary windings of the multiphase transformer 107 are connected to suitable number of rectifier diodes of the multi-pulse diode bridge rectifier 108 to generate a galvanic isolated, adjustable and controllable variable DC component.

Any remaining AC ripple on the fundamental DC component is further filtered by the output filter 109 ($L_{dc2}$-$C_{dc2}$) to obtain an ultra-low AC ripple voltage that is desirable for many types of DC load applications, including the illustrated electroplating process. In certain examples, an isolated signal of output DC voltage is provided as a feedback signal 100f and the feedback signal is compared to a command DC reference in a proportional integral (e.g., PI) controller whose output is an adjustable AC voltage command to control the inverter 101. Suitable examples are illustrated in U.S. Pat. No. 7,626,836, incorporated by reference. In one example, the isolated DC output current feedback signal is compared to a current limit reference and the closed-loop operation will regulate or fold back the inverter output voltage until the current limit reference is satisfied. The overall system can be configured as an individual AC line to DC load rectifier, or multiple DC load rectifiers with a common AC bus line connection or multiple DC load rectifiers connected at the inverter DC input side from a common DC bus rectifier system.

In certain examples, the AC/DC power conversion system converts input AC line voltage from one fixed frequency and fixed magnitude to another form and level of DC voltage (zero frequency) of variable DC voltage magnitude. The disclosed power converters 100 may include multiple stages for different types of conversion applications, and may be used for other applications beyond the disclosed electroplating process. For example, many applications require an output DC voltage with an AC ripple voltage component as small as possible. Example ultra-low AC ripple voltage requirements typically involve industrial processes such a coating, galvanizing, plating, desalinization or power supply applications. In an electro-coat (or E-coat) automotive application example, electrical current is used to deposit paint or epoxy from the plating solution 4 to a vehicle workpiece 3. The process works on the principle of "Opposites Attract" using the DC voltage positive (+) and negative (−) electrodes.

Figure 2:
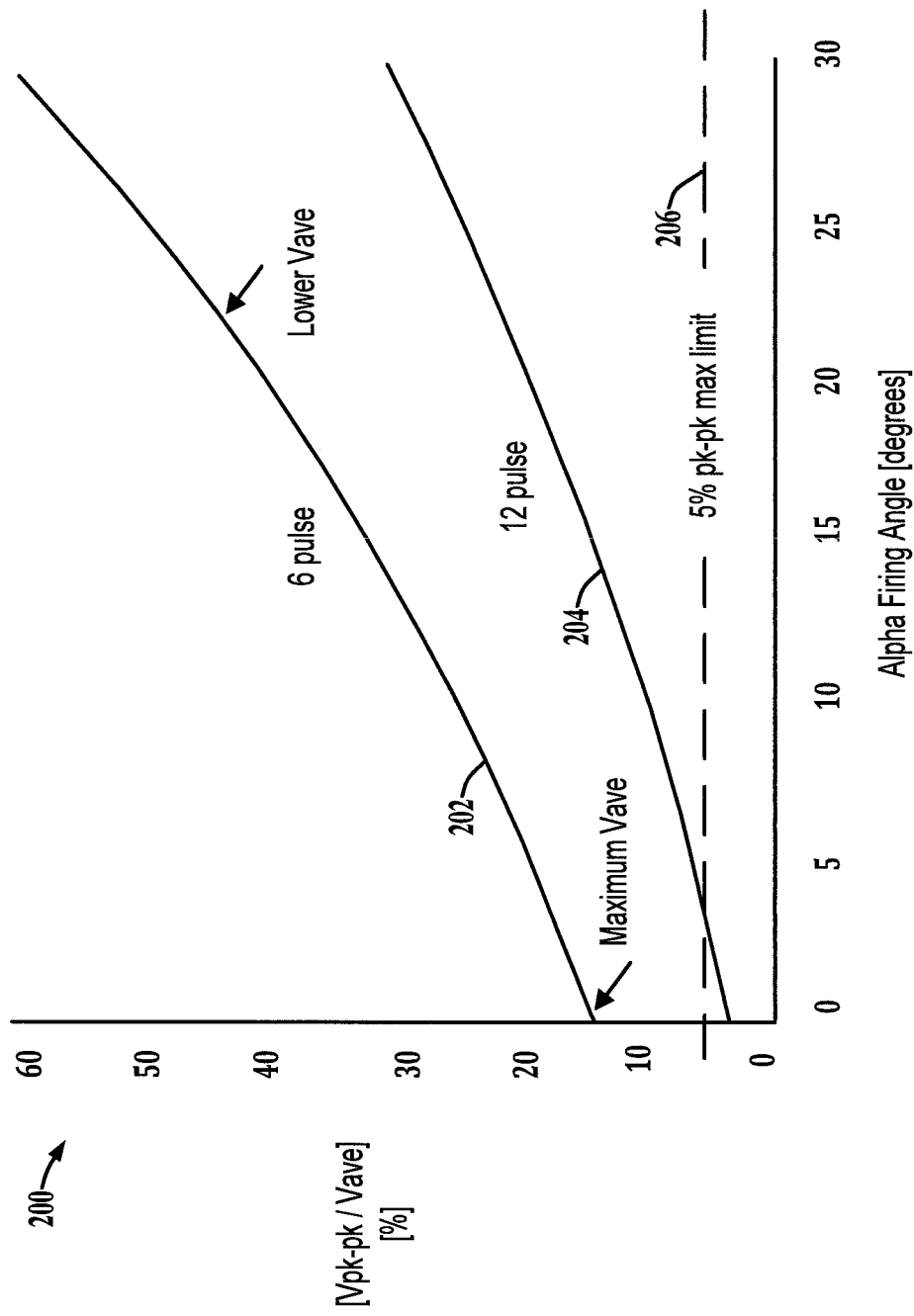
FIG. 2 is a graph showing AC ripple voltage and average DC output voltage for SCR bridges as a function of firing angle delay.

Referring also to the graph 200 and FIG. 2, conventional techniques to obtain an isolated and adjustable DC output voltage from a 60 Hz (or 50 Hz) three phase AC utility line use silicon controlled rectifier devices (SCRs) with phase angle firing control synchronized with the AC line. Using six SCRs in a standard 6-pulse rectifier design can function as an adjustable DC supply, but leads to very high peak-to-peak AC ripple voltage at the rectifier DC output as shown in the curve 202 of FIG. 2. The average DC output voltage [Vave] is proportional to the peak AC utility line voltage multiplied by cos(α), where α is the SCR firing angle. As the SCR firing angle (α) is increased or phased back, the average output voltage value Vave DC is lowered but AC ripple increases. At full dc output voltage (firing angle α=0°) for the 6-pulse SCR bridge (curve 202), the peak-peak ripple $V_{pk-pk}$ is approximately 15% and as DC output is adjusted to lower values (increased α firing angle), the % AC ripple becomes even larger at 60% for α=30°. AC ripple is unacceptable for most DC industrial process loads, such as electro-plating, electro-phoretic deposition (e.g., automotive E-coat paint primer) or electro-galvanizing applications that require a 5% maximum [AC pk-pk ripple voltage/Vave DC] ratio over an adjustable 10% to 100% DC average voltage range. Obtaining 5% AC ripple voltage with a 6-pulse SCR DC output would require a physically large and costly inductor-capacitor (Ldc–Cdc) low pass filter to reject 6-pulse 360 Hz AC ripple over the DC output voltage range. As shown in the curve 204, using a 12 pulse SCR converter can reduce the peak to peak ripple amount, but this curve still exceeds the example 5% limit (curve 206) for firing angles α of about 4° or more.

Figure 3:
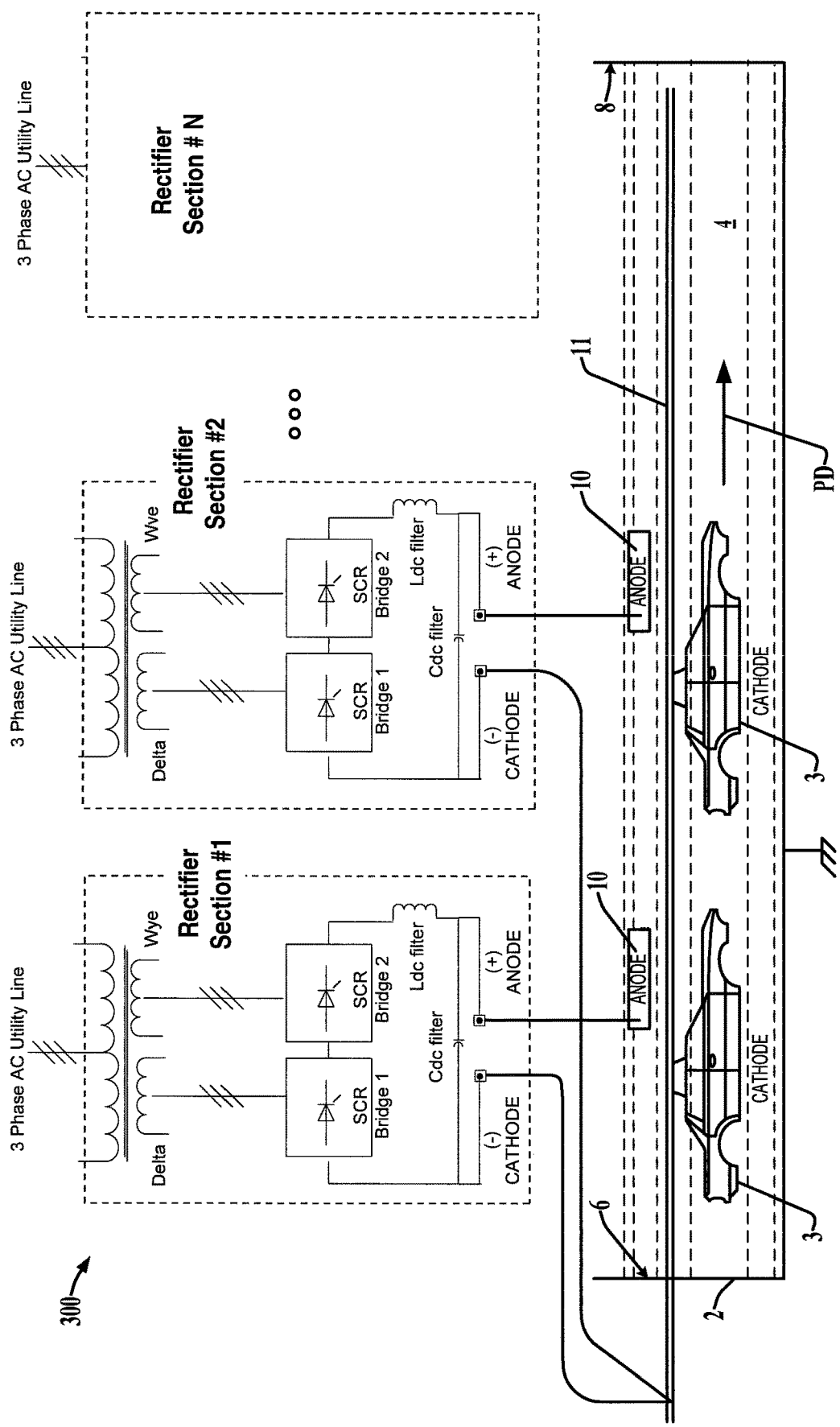
FIG. 3 is a graph showing an example coating process using an AC/DC rectifier system with multiple 12-pulse SCR rectifiers.

FIG. 3 illustrates an SCR bridge-based system 300 for electro-plating lines. In applications having a maximum 5% ripple restriction, a 12-pulse AC/DC SCR rectifier is used with lower AC ripple voltage than was the case for a 6-pulse design (e.g., curve 204 in FIG. 2 is lower than curve 202). Accordingly, the 12-pulse system 300 can use a smaller Ldc–Cdc filter to reject AC ripple and to reduce size, weight and cost of the overall AC/DC conversion topology vs 6-pulse rectifier design. As seen in the curve 204 of FIG. 2, the 12-pulse rectifier at full dc output voltage (0° firing angle), has a tolerable 3% $V_{pk-pk}$ AC ripple value, but the ripple [% AC $V_{pk-pk}/V_{dc\ ave}$] still becomes large toward 30% or more as the DC output is adjusted to lower values (increased α). However, since filter volume is proportional to applied ripple frequency, the 12-pulse 720 Hz ripple design has an Ldc–Cdc filter volume ½ that of 6-pulse 360 Hz rectifier ripple. The following equation relates the plating charge Q according to Faraday's electrolysis law:

$$Q=Idc\ t=zFn \qquad \text{Eq.1}$$

where Q is charged passed, Idc is current passed, t is time the current is passing, z is change in oxidation state, F is the Faraday constant 96,485 Coulomb/mole, (charge of one mole of electrons), and n is amount of substance oxidized or reduced. An example automotive E-coat process uses DC current (Idc) to deposit organic paint particles solids (~20%) onto a part in a de-ionized water/solvent (80%) solution. The applied average DC voltage (Vave) results in electrolysis of water in the paint solution, generating $O_2$ gas at the anode and $H_2$ at the cathode. Simultaneously, anode (+) voltage positively charges paint solids (e.g., 20-50 micron spherical particles) in the paint solution that are attracted and migrate to the car frame (−) cathode. Paint particles deposited on (−) electrically conductive substrate surface form an insulating film. Film build is self-limiting as the film becomes more insulated as a maximum film thickness is approached (e.g., 1.0-1.2 mils). The ability to E-coat "hard to reach" areas, in certain examples is dependent on the applied voltage, bath solids, conductivity, deposition time, bath temperature, solvent levels, and proper tank agitation, deposition time and the number of rectifier stations in the system.

Figure 4:
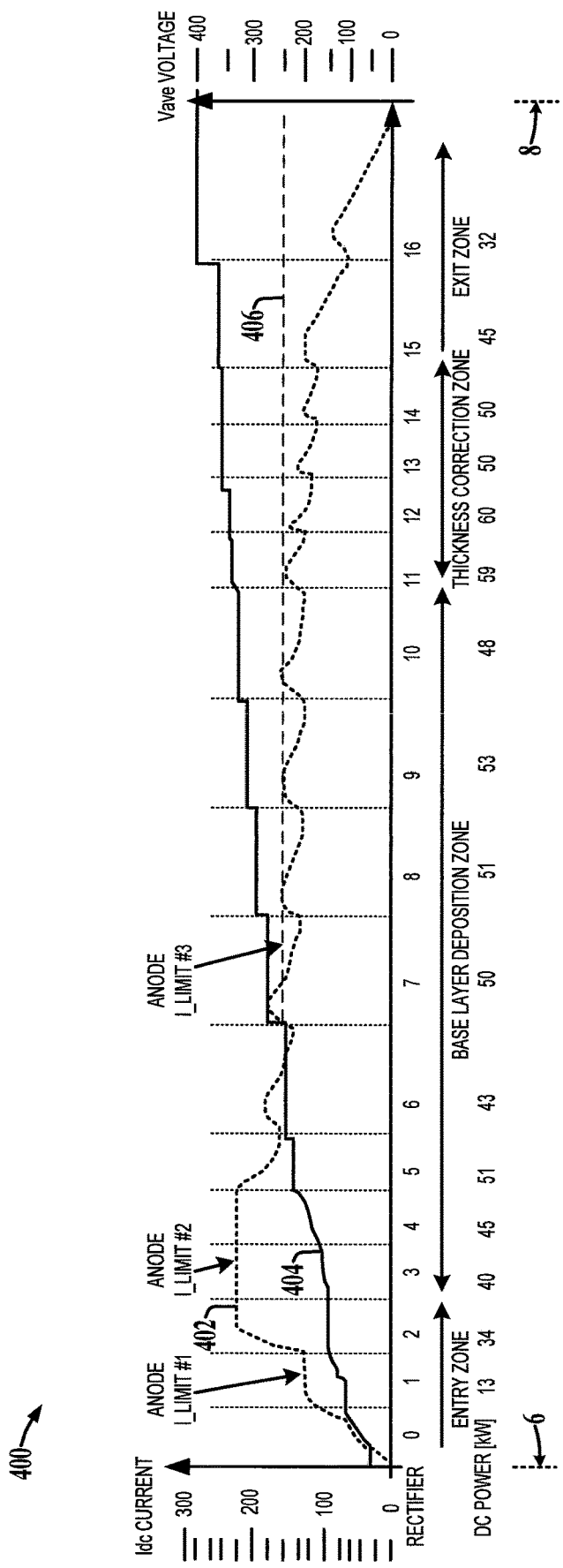
FIG. 4 is a graph showing anode-to-cathode voltage and anode current characteristics at each anode rectifier stages using multiple 12-pulse rectifiers.

FIG. 4 shows an example profile for controlling the system, including a DC output current curve 402 Idc, along with an average voltage curve 404 Vave and numerically indicates DC power (kilowatts) at each of 16 example rectifier stages (e.g., zones) using multiple 12-pulse rectifier sections, as a workpiece is E-coated while traveling through the system. Each rectifier regulates a set point Vave anode DC voltage to an E-coat solution that is basically resistive type load. If resulting Idc current is above the indicated rectifier anode current limit set point regulated value, then the average voltage Vave command is automatically reduced to maintain the maximum allowed anode current. The anode current regulator mode is typically invoked on the initial four rectifier stages when the incoming car is unprimed metal, thus appearing as a zero ohm load. In one example, the first rectifier operates initially at a low ~125 Vdc set point, and increases in 20-50 Vdc increments to the last rectifier set-point at a higher ~400 Vdc to correct final build film thickness due to the insulating film resistance increases as the film thickness increases.

Figure 5:
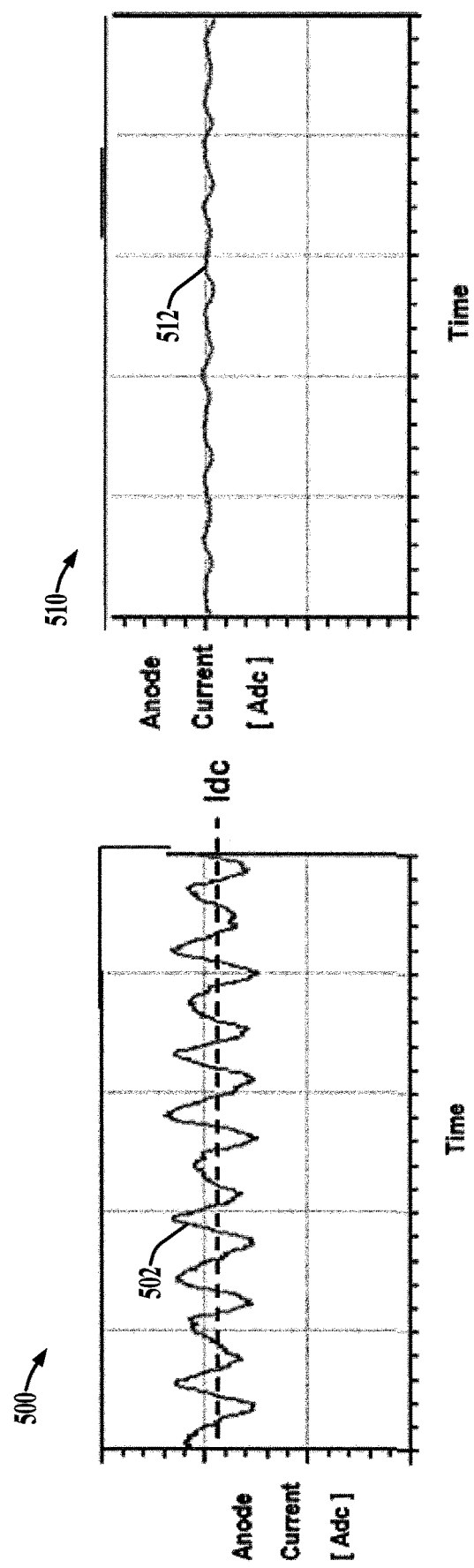
FIG. 5 is a graph showing DC load waveforms for two different AC/DC power conversion topologies.

Referring also to FIG. 5, graphs 500 and 510 illustrate anode current as a function of time. The first graph 500 includes an anode current curve 502 for a 12-pulse SCR rectifier, and the curve 512 in graph 510 shows anode current with significantly reduced ripple content in the system one of FIG. 1. One disadvantage of the 12-pulse SCR rectifier is large AC ripple component in the adjustable 50 to 450 Vdc range, as shown in the graph 500. The curve 502 shows the Idc average plating component (the DC component) plus 5% [pk-pk/ave] ripple current. For plating applications, the average film coat thickness is largely determined by the Idc average component, and the 12-pulse SCR rectifier approach in FIG. 3 results in hills and valleys corresponding to the ripple variation shown in the curve 502. In addition to the adverse effects of the thickness variations, use of the system to electroplate to a required minimum thickness leads to excessive and wasted E-coat solution used to cover the workpiece, which can drastically increase manufacturing costs. As seen in the curve 512 of the graph 510, the use of the converters 100 for the individual zones or anode structure stages of a plating system leads to significantly reduced ripple current, and hence improvements in plating uniformity as well as reduction in system cost. In particular, the adjustable voltage, adjustable frequency inverter-based converters 100 in FIG. 1 can be used to implement electroplating systems with tank anode structures 10 driven by tightly controlled DC current values Idc with minimum ripple, for example, 0.14% [pk-pk/ave] ripple shown the curve 512, which represents a 30× improvement over SCR-based AC/DC converters as shown in FIG. 3.

As seen in FIG. 2 above, another disadvantage of existing AC/DC 12-pulse SCR rectifier systems is the inherently large AC ripple component over the adjustable 50-450 Vdc range. As shown in FIG. 4, the various zones or stages in certain examples have different voltage setpoints in order to achieve a desired plating of a workpiece. The film thickness hills and valleys created follow the AC ripple variation, so introduction of hills and valleys at the initial stages (when the AC ripple is the highest) requires the addition of further downstream stages to compensate for the valleys created in each section. At the later stages, higher voltage levels are needed, and thus the power supply needs to operate over a relatively large voltage range to allow modular use of similar power supplies in each stage of a multistage system. The power converter modules 100 in FIG. 1 advantageously provide significant ripple current control advantages over the SCR rectifier sections of FIG. 3, for example, to achieve 0.14% [pk-pk/ave] ripple shown in the curve 510 of FIG. 5. The use of the disclosed power converter modules 100 allows construction of a system with fewer stages or sections, thereby facilitating significant reduction in initial capital cost and installation cost, while simultaneously making a better product with uniform film build E-coat thickness large enough to meet baseline requirements for quality without wasting significant amounts of plating solution 4.

A further disadvantage of existing AC/DC 12 pulse SCR rectifier systems is the physically large size, weight, expense and watts loss intensive Ldc filter inductor, along with physically large volume and inherent known low life of electrolytic type Cdc filter capacitors. For example, for a series connected 12-pulse SCR converter, the Ldc Cdc volume required is smallest when operating at close to 0 degrees firing angle α. Equation 2 shows the volume $V_{ave}$ for a 12-pulse SCR converter output Vdc voltage as a function of the firing angle α.

$$V_{ave} = \frac{2+3\sqrt{6}}{\pi} V_{phase} \cos(\alpha) \qquad \text{Eq. 2}$$

An optimum secondary phase winding voltage $V_{phase}$ (e.g., minimum $V_{line-neutral}$), using a maximum Vave=450 Vdc and lowest α=0° in Eq.2 is thus 96 Vrms. E-coat applications we require a regulated 450 Vdc even when utility supply tolerance is low, so that required delta–wye secondary winding $V_{phase}$=96 Vrms at 480 Vac 12%. $V_{phase}$ rises to 108 Vrms when the ac utility line returns to normal. Using Eq.2 at nominal line, α=27° for 450 Vdc and α=27° for 50 Vdc. The 12-pulse SCR rectifier can never operate at low α firing angle in FIG. 2 where the power structure delivers low peak to peak ripple <5%. At a rated 450V DC with α=27°, the [$V_{pk-pk}$ $V_{ave}$] ratio in FIG. 2 exceeds 25%, and at minimum 50 Vdc, the ratio is even greater implying the filter components must be large to maintain less than 5% ripple over any set point. The low fixed 60 Hz utility frequency power applied to the 12-pulse SCR rectifier results in an output dc ripple of only 720 Hz fundamental ripple frequency plus additional higher frequency harmonics due to firing angle phase back, resulting in the components of the LC filter $L_{dc}$ $C_{dc}$ being physically large in size, weight, cost and watts loss. The converter modules 100 of the present disclosure provide ideal solutions for E-coat and other plating processes via a AC/DC rectifier structure topology that has a variable sine wave source frequency (inverter output fundamental) much greater than the line frequency to minimize filter size, weight, cost and peak-peak output ripple. In certain examples, for instance, the adjustable voltage, adjustable frequency inverter 101 provides the AC signal at a frequency of approximately 120-600 Hz, such as –300 Hz in certain examples. For instance, one suitable operating frequency for the inverter 101 is about 180 Hz. This achieves significant ripple current reduction in the DC output signal, while allowing use of compact filter components in the system 1.

Figure 6:
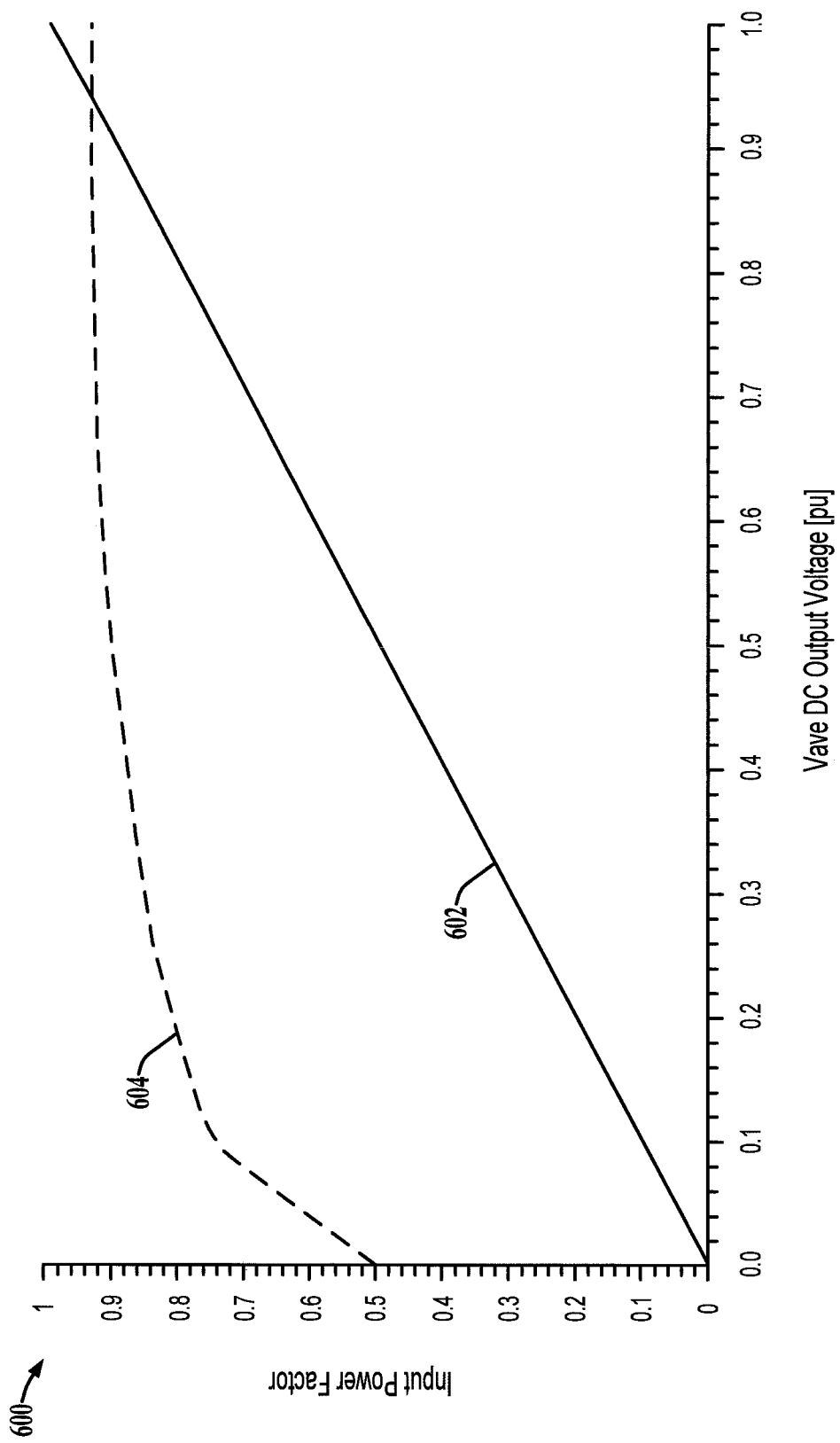
FIG. 6 is a graph showing input power factor characteristics of 6-pulse versus 12-pulse SCR rectifier sections.

FIG. 6 provides a graph of system input power factor as a function of the average DC output voltage, illustrating a curve 602 showing the power factor performance of the example 12-pulse SCR rectifier, as well as a curve 604 showing significantly improved power factor performance for the system 100 of FIG. 1 using a six pulse rectifier front end driving an adjustable voltage, adjustable frequency PWM inverter 101. As seen in FIG. 6, another disadvantage of existing AC/DC 12-pulse SCR rectifier systems with AC line commutated firing angle DC output control over an adjustable 50 to 450 Vdc range, is an inherent low power factor to the AC utility line. Total power factor in one example is quantified as a distortion factor multiplied by a displacement factor. In one example, a distortion factor for 12-pulse SCR rectifiers is 0.9886 and a displacement factor is a function of cos(α). For a nominal ac line Vphase=108 vrms, the highest possible Vave is 505 Vdc at a full on condition of α=0°. At the example maximum application operating point, 450 Vdc (0.89 pu) at α=27°, the total power factor is at best 0.88, and at the example minimum application operating point, 50 Vdc (0.10 pu) at α=84°, the total power factor is a very low value of 0.09 as plotted in FIG. 6. This low pf causes a high kVA demand over most of FIG. 4 rectifier (~50 kW average) sections. The low power factor and high kVA demand result in utility penalty charges as well as increased input transformer KVA rating with increased upstream system losses as result of higher current required than necessary.

Figure 7:
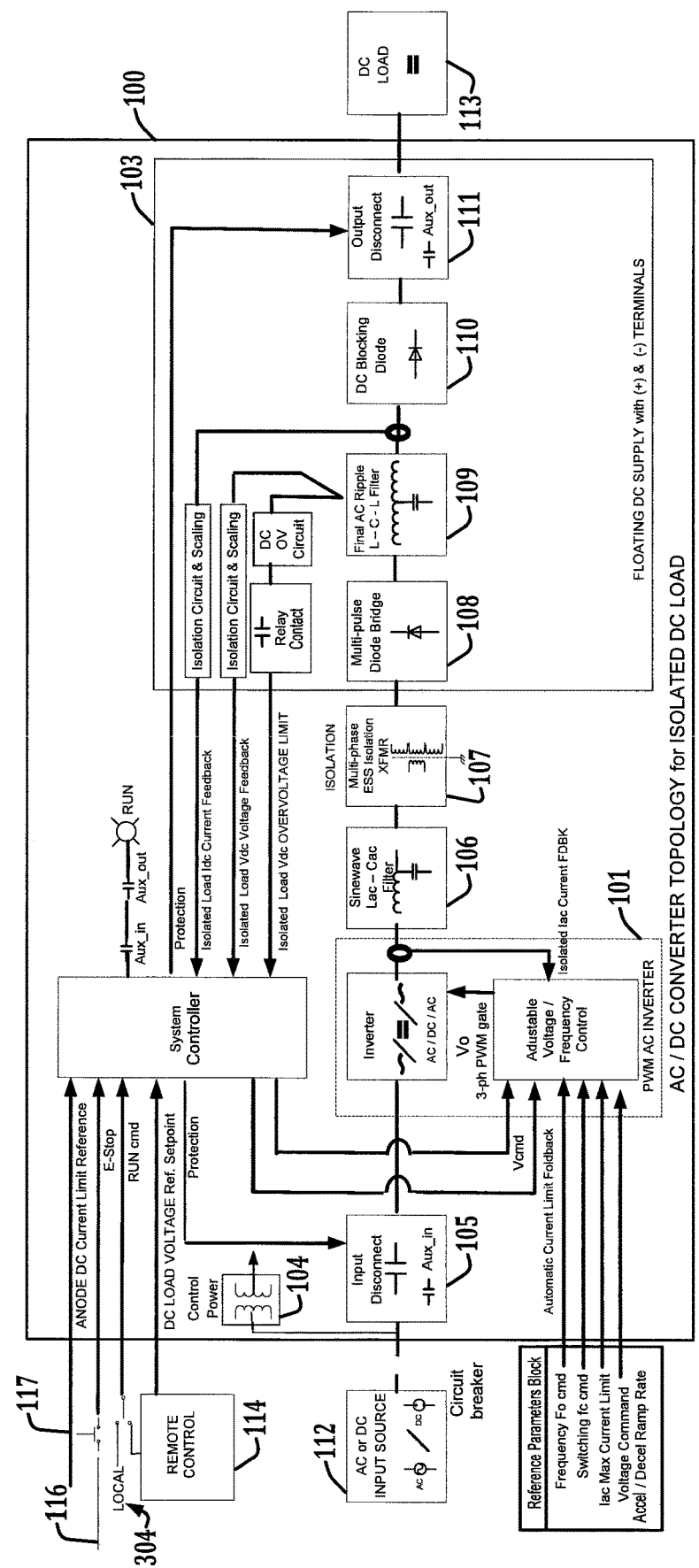
FIG. 7 is a schematic diagram showing an adjustable AC/DC conversion topology to regulate an isolated DC load.

FIG. 7 is a schematic diagram showing an adjustable AC/DC conversion topology to regulate an isolated DC load. The adjustable AC/DC converter modules 100 operate to regulate an isolated DC load with ultra-low AC ripple. The input power in one example is provided through an input disconnect (e.g., breaker) 105, and the input power can be used to drive a control power transformer 104. As shown in FIG. 7, the PWM inverter 101 in one example includes an adjustable voltage/adjustable frequency controller to operate switching devices of the inverter, and the controller receives AC signal feedback from the output of the inverter stage. The local controller of the PWM inverter 101 in one example receives a voltage command signal and an automatic current limit fold back value from a system controller in the converter module 100. The system controller and this example includes an input 116 to receive and emergency stop (E-stop) input, as well as another input 117 to receive an anode DC current limit reference value from an external device. A remote control component 114 in one example provides a DC load voltage reference setpoint to the system controller, for example, as part of a control algorithm used to operate multiple converter modules 100 in a system such as shown in FIG. 1. The converter module 100 in FIG. 7 includes a sinewave filter 106, a multiphase isolation transformer 107, a multiphase diode bridge rectifier 108, an output filter 109, and a blocking diode 110 as previously described. In addition, the converter 100 in FIG. 7 includes an optional output disconnect circuit 111 allowing the system controller to selectively disconnect the output from the DC load 113 (e.g., from the tank anode structure 110). In addition, the system controller in FIG. 7 receives an isolated load DC voltage overload limit signal through an overvoltage circuit and a relay contact in a floating DC supply portion of the converter 100, as well as an isolated load DC voltage feedback signal (e.g., the feedback signal 100f in FIG. 1 above) from the floating (e.g., isolated) DC supply portion after the isolation transformer 107. Moreover, the floating DC supply portion 103 of the module 100 also provides a DC current feedback value to the system controller (e.g., feedback value 100f in FIG. 1 above).

The input source 112 to the AC/DC conversion as shown in FIG. 7 can be derived from utility 50 HZ/60 Hz AC source in one embodiment, or a DC source can be used as an alternate embodiment. In contrast to the 12-pulse SCR approach, the converter modules 100 in one example use a 6-pulse utility interface front end with an AC line reactor and bridge output DC link inductor. Distortion factor for 6-pulse rectifiers is 0.95 and displacement factor is a constant 0.984 resulting in Total Power Factor=0.934. Distortion factor for lower KW loads in FIG. 4 Section 1 & 2 is lower so that overall Total Power Factor is lower in these sections, but overall the 6-pulse front end is a significant improvement over SCR rectifiers having low displacement power factor as application adjustable output voltage is lowered.

Another disadvantage of the 12-pulse SCR rectifier approach in FIG. 3 is poor transient load control with ac line commutated firing angle DC output control, over an adjustable 50 to 450 Vdc range. The 12-pulse SCR rectifier, in this regard, suffers from current oscillation resulting in the first three stages or sections of a multistage electroplating tank system. The unprimed frame the initial stage has no film resistance built up, so the SCR supply is driven into immediate current limit operation as the output voltage is essentially being applied to a low impedance load. This results in uncontrollable current oscillations due to the inability of the 12-pulse SCR rectifier to respond fast enough because of the AC line commutation delay. In addition, the current limit is a non-linear unstable controller, and the output filter $L_{dc}$ $C_{dc}$ and the 12-pulse SCR rectifier system is an inherent un-damped oscillation circuit. Accordingly, the resulting ripple current oscillation in the initial entrance stage has a significant adverse effect on film thickness deposited even before the remaining sections are applied.

In contrast, the inverter-based converter modules 100 of the present disclosure utilize fast switching semiconductors (e.g., operating at a carrier frequency of 4 kHz to deliver a 250 us maximum response time). Thus the inverter output voltage regulator and current regulator implemented by the system controller in FIG. 7 can control current without oscillations and maintain desired film thickness in this application startup mode, even for the initial stages in the multi-stage electroplating process. Another disadvantage of the 12-pulse SCR rectifier systems with AC line commutated firing angle, is the susceptibility of having a commutation shoot thru misfiring of the firing angle control when the AC line power quality contains sags, surges or frequency disturbances. The inability of the 12-pulse SCR rectifier system to phase synchronize on these disturbances typically results in blown AC line fuses and loss of rectifier DC output. In contrast, the converters 100 provide quick response via the high-frequency inverter switching control.

The 12-pulse rectifier system in FIG. 3 also requires an isolation transformer to stop circulating current between multiple rectifier units that have a common fixed voltage AC input bus connection, but with different anode output DC voltages through the E-coat plating solution, into a common metal frame cathode connection. The unit to unit isolation can use a 12-pulse isolation transformer with secondary delta and wye windings feeding two 6-pulse SCR adjustable DC converters, that inherently allows each unit (+)/(−) output electrodes to have an individual floating DC reference potential at each section and lower ac ripple than a 6-pulse design. However, Eq.3 below shows an isolation transformer primary with a fixed 50 or 60 Hz line frequency requires a magnetic core size $[N_{turns} A_{core}]$ which is large for given material $B_{max}$.

$$V/f = N_{turns} A_{core} B_{max} \qquad \text{Eq.3}$$

Thus, a further disadvantage of the 12-pulse SCR based AC/DC conversion system is that the magnetic size, volume and cost is fixed to the standard low AC line frequency (e.g., 50 or 60 Hz). Also the AC/DC conversion system requires an AC source and disallows other inputs such as DC Input sources. In contrast the proposed converters 100 facilitate unit-unit isolation with an AC isolation transformer placed at the inverter output with fundamental frequency set up to about 600 Hz in one example. Higher frequency operation in Eq. 3 allows a transformer of smaller size and weight by 1/f factor in Table 1 as well as lower cost than the 12 pulse SCR-based 50/60 Hz isolation transformer method.

With respect to anode-cathode polarity, the floating rectifier section output DC polarity for cathode E-coat [anode (+), cathode (−)] is used in one example for corrosion resistance at low film thickness and performs well when bimetallic dissimilar metals are in contact. Anodic E-coat [anode (−), cathode (+)] is also possible, especially for depositing certain epoxy films since it penetrates and coats interior portions of complex parts better. The 12-pulse isolation transformer inherently allows the DC output electrodes to have a floating potential, which can be reversed. The electrode polarity reversal can be implemented using the adjustable voltage/adjustable frequency PWM inverter-based converters 100.

Figure 8:
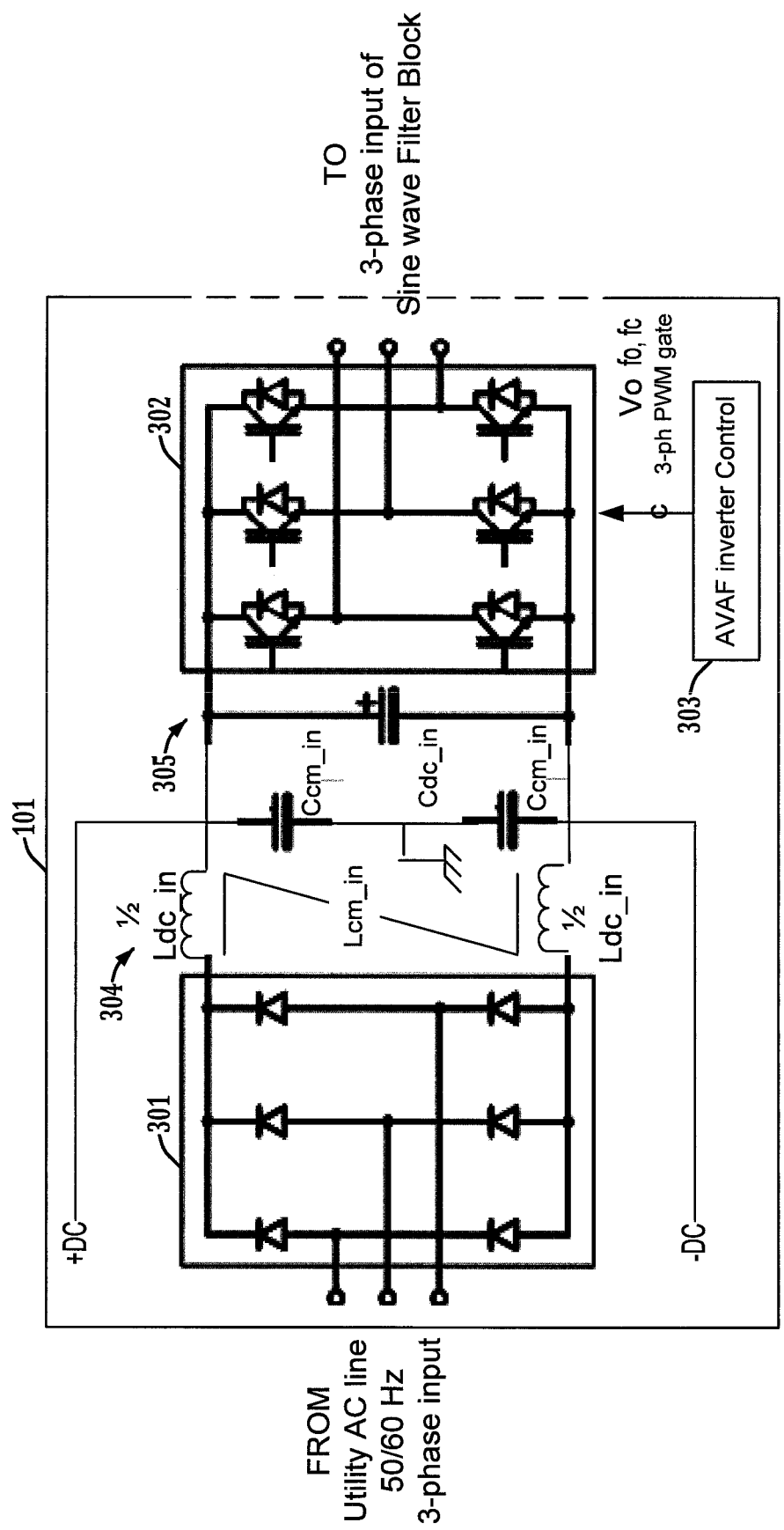
FIG. 8 is a schematic diagram showing a power block of the Adjustable AC/DC Conversion Topology.

FIG. 8 illustrates further details of an example inverter 101 in the system 1 of FIG. 1, which interfaces to the input energy source. In this example, the inverter circuit 101 includes an input rectifier 301, in one example, a six diode passive three-phase rectifier. In other examples, an active front and (AFE) rectifier can be used. In other examples, the inverter 101 directly receives a DC input. The DC output from the illustrated rectifier 301 is provided to a DC bus circuit 305 including filtering components 304 with inductors $L_{dc\_in}$, one or more common mode capacitors $C_{cm\_in}$ and a DC bus capacitor Cdc_in to provide differential mode filtering to remove rectifier 6× AC ripple frequency components and to provide a stable DC bus voltage as an input to the output inverter switching circuit 302. The inverter switching circuit 302, in turn, includes three sets of upper and lower (e.g., high side and low side) IGBTs or other semiconductor switches individually connected between one of the DC bus lines and a corresponding one of three inverter output phases or lines for connection to the sinewave filter 106. A PWM inverter control circuit 303 provide switching control signals to operate the inverter switches at a PWM carrier frequency rate ($f_c$) at least 10-20× higher than the fundamental AC output frequency (fo) out of the inverter terminals.

Figure 9:
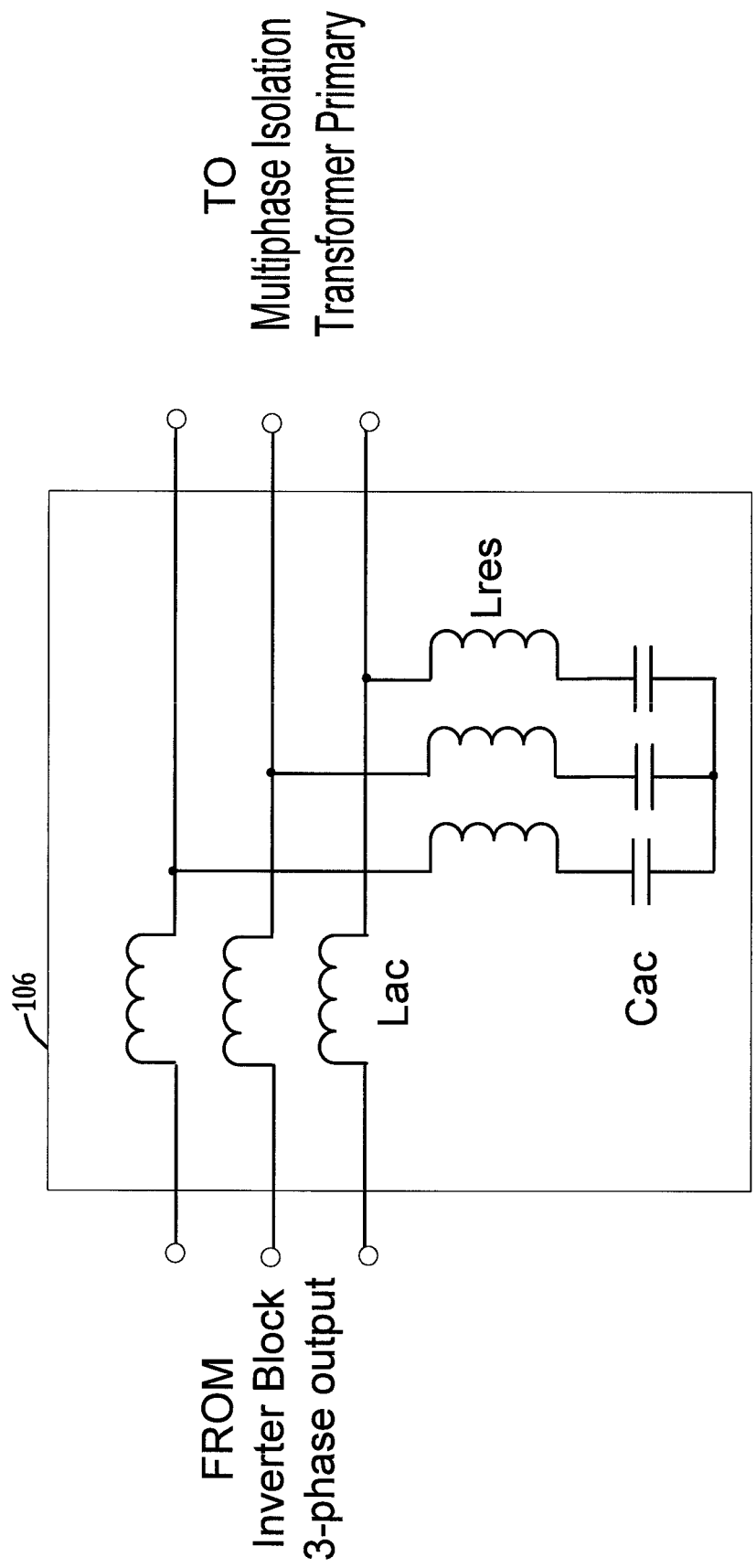
FIG. 9 is a schematic diagram showing components used in a sine wave filter power block.

FIG. 9 is a detailed schematic illustrating components used in an example sinewave filter circuit 106 of the inverter-based converter modules 100. In this example, a three phase filter circuit 106 includes inductors Lac and Lres associated with each phase, as well as a capacitor Cac connected between each one of the inductors Lres and a common connection (e.g., neutral). Other forms of the LC and/or LCL filters can be used, whether single phase or multiphase as in the illustrated example. The filter circuit 106 receives the AC signal (e.g., a three phase AC waveform) from the output of the inverter 101, and includes an output to provide a filtered AC signal to the multiphase isolation transformer 107. In operation, the sinewave filter 106 removes output Vo carrier frequency voltage components at cutoff frequencies and harmonics thereof (e.g., fc, 2fc, 3fc, . . . , etc.) resulting in a quasi-sinusoidal 3-phase ac voltage to the multi-pulse primary of the isolation transformer 107. In practice, the primary AC voltage is evenly distributed across the transformer windings to prevent or mitigate winding failures. A standard $L_{ac}$–$C_{ac}$ sine wave filter design can be used in certain examples where the resonant inductance component $L_{res}$ is set to zero. In certain examples, the filter cutoff frequency is set to allow fundamental fo voltage components to pass while attenuating fc and higher frequency voltage components. An alternative sine wave filter topology may be used as in U.S. Pat. No. 6,208,537, incorporated by reference, for example, using $L_{res}$ and adjusting $C_{ac}$ to a tuned trapped carrier frequency component to shunt that voltage component away from the load side.

The PWM AC inverter output voltage in one example is filtered using $L_{ac}$–$C_{ac}$ sine wave output filter (SWF) methodologies or using techniques described in U.S. Pat. No. 6,208,537, incorporated herein by reference. In certain examples, this recovers only the 3-phase fundamental sine wave voltage, and removes most or all of the undesirable fc carrier frequency voltage components, which can be as large as the fo voltage component. The core magnetic material of the sine wave filter 106 is of design importance, since all the high carrier frequency voltage component is impressed across the core and may require a thinner lamination steel. The sinewave filter 106 in certain embodiments does not require a critical ripple voltage content at this stage. Potential benefits of the sinewave filter 106 at this stage in the disclosed converters 100 is threefold. The sinewave filter 106 presents a relatively clean quasi-sinusoid voltage to the isolation transformer primary, so that inverter high dv/dt rates do not fail the transformer primary coil winding. The sinewave filter 106 also absorbs the inverter-induced high frequency core loss in a separate SWF magnetic inductor device, so that a standard isolation transformer core can be easily designed and used with standard available laminations, without the burden of increased high-frequency core losses. The sinewave filter 106 also smooths out the sine wave peak voltage, so that the transformer secondary multi-pulse 18-pulse diodes may correctly commutate near the peak of the sinewave and form a low ripple average and adjustable DC load voltage.

Figure 10:
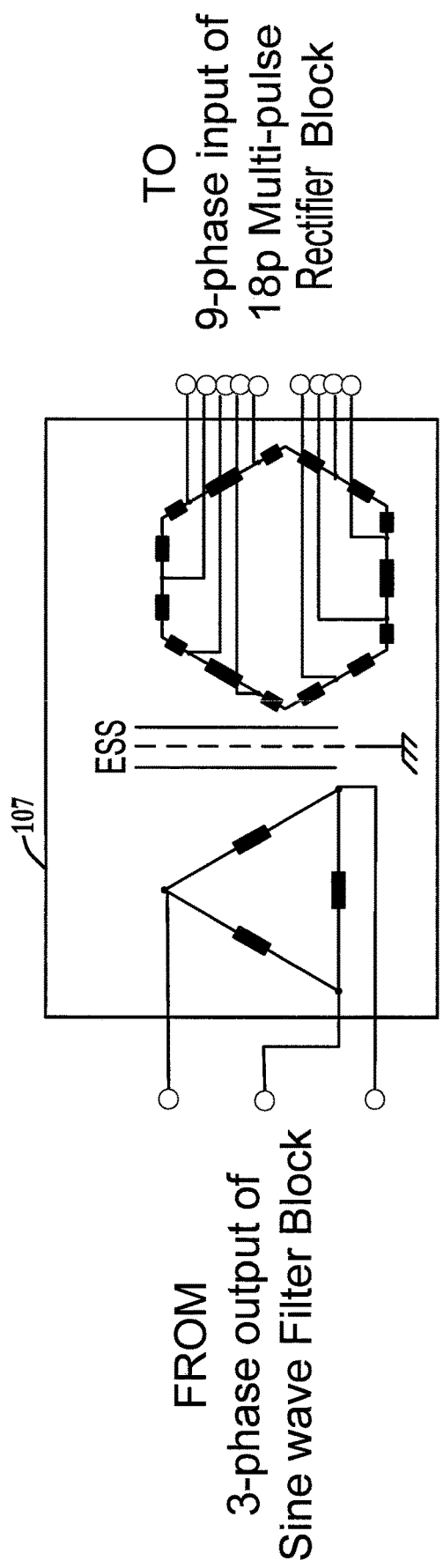
FIG. 10 is a schematic diagram showing components used in a nine phase isolation transformer block.

FIG. 10 shows an example 18-pulse, 9 phase multi-pulse isolation transformer embodiment 107. One suitable example is described in U.S. Pat. No. 6,335,872, incorporated herein by reference. The transformer input is a Delta-connected primary that receives the adjustable three phase quasi-sine wave filtered voltage at the fundamental frequency fo commanded by the inverter 101. The transformer 107 transforms the secondary side to nine phases at a primary/secondary turns ration suitable for the DC load. The transformer 107 in this example also includes an electrostatic shield (ESS) to shunt inverter PWM common mode voltage noise to ground and away from the isolated DC load.

The isolation transformer 107 in FIG. 10 prevents circulating current between multiple rectifier units that have a common fixed voltage AC input bus connection, but with different anode output DC voltages. Importantly, the isolation transformer primary fed from the sinewave filter 106 is not fixed at 50 or 60 Hz AC line frequency, but now can be utilized at inverter output fo up to 600 Hz. An advantage of using higher inverter fundamental frequency fo is benefits in cost, size, volume and weight reduction of the transformer. Additional benefits of the isolation transformer 107 is to increase the rectifier pulse count, and thus obtain ultra-low load output AC ripple voltage, by utilizing higher multi-phase (e.g. 3-phase to 9-phase or 3-phase to 12-phase) transformer windings with its secondary windings connected to suitable number of rectifier diodes. One suitable isolation transformer embodiment is described in U.S. Pat. No. 6,335,872, incorporated by reference, with primary winding connected to the inverter output at a frequency fo and secondary windings feeding an 18-pulse diode bridge sized for the DC kW load of each E-coat rectifier section. Another suitable isolation transformer embodiment can use concept shown in U.S. Pat. No. 6,198,647, incorporated by reference, with primary winding connected to the inverter output at fo and secondary windings feeding a 24-pulse diode bridge sized for the load kW of each E-coat rectifier section.

Another advantage of the isolation transformer 107 is use of an electro-static shield (ESS), inserted between primary and secondary windings that is chassis grounded on one end. The ESS mitigates system electro-magnetic interference (EMI). Inverter PWM switching creates a common mode voltage ($V_{cm}$) occurring at approximately 6× fc rate, that tends to drive common mode ground current noise ($I_{cm}$) out toward the E-coat tank cathode ground. $I_{cm}$ is primarily limited in magnitude by $L_{ac}$ inductance of inverter SWF and also by transformer primary winding resistance and leakage inductance. The ESS functions inherently as a low impedance bypass capacitor ($C_{ESS}$) from primary winding to chassis ground to the high-frequency CM current, shunting noise directly to internal cabinet chassis ground, away from the E-coat system ground. $I_{cm}$ flowing in internal chassis ground is returned back to the noise source through ground connected $C_{cm\_in}$ bypass capacitors to (+)/(−) inverter dc bus. Thus, both DC load and AC Line have minimal EMI issues resulting from each anode rectifier section. Another advantage of the electrostatic shield in certain isolation transformer embodiments 107 is system voltage spike protection from AC Line side transients. Standard input MOVs clamp peak transient magnitude to ground before the AC 6-pulse bridge. However, DC link inductor $L_{dc\_in}/Z_{cm}$, inverter output SWF inductor $L_{ac}$ along with transformer $C_{ESS}$ form an L-C attenuation network to reduce high-frequency high-voltage magnitudes from entering the E-Coat tank and cause possible arcing. In addition, the electrostatic shield ESS embodiments also facilitate system noise protection of an individual inverter section, resulting from possible DC load Side interaction of multiple $I_{cm}$ entering from 16 other anode rectifier sections. In this case, ESS functions as a low impedance bypass capacitor ($C_{ESS}$) from secondary winding to chassis ground to any high-frequency common mode current, shunting this noise directly to internal cabinet chassis ground, away from the individual electronic inverter section.

Figure 11:
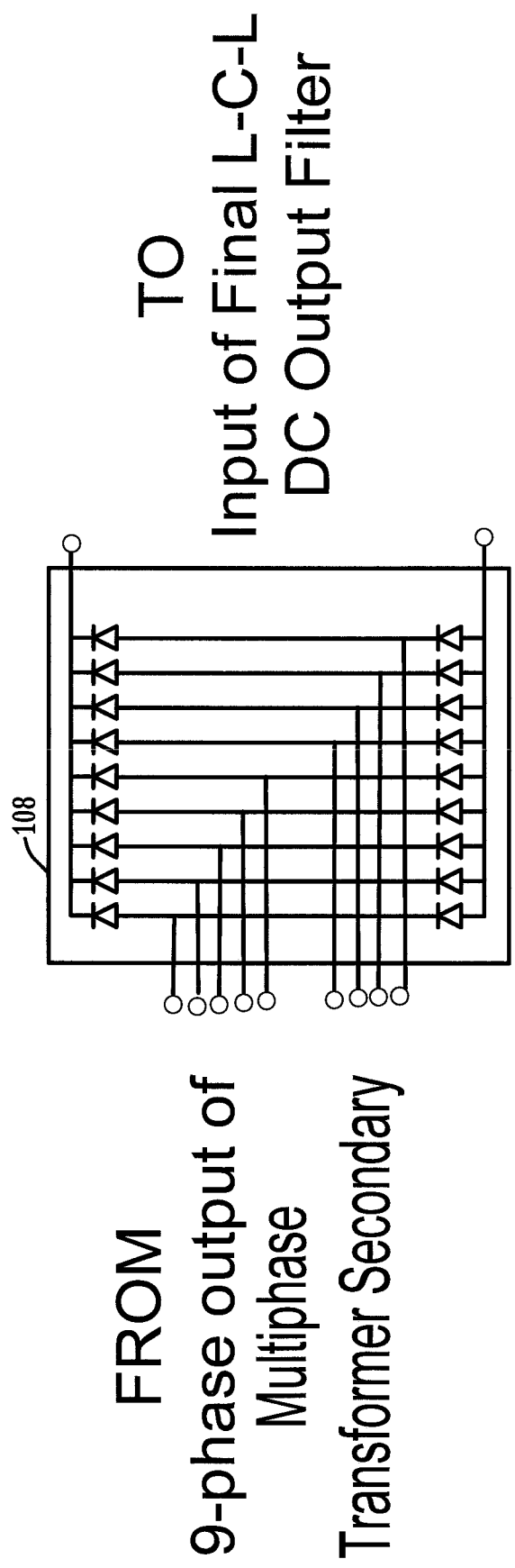
FIG. 11 is a schematic diagram showing components used in one embodiment with 18 diodes in an 18-pulse rectifier block.

FIG. 11 shows an example 18 diode bridge rectifier circuit 108 to provide an 18-pulse rectifier. The rectifier input is connected to the nine phase secondary windings of the isolation transformer 108. The output terminals of the rectifier 108 provide a DC rectifier output signal with a rectified average DC voltage value regulated in steady state by the inverter 101 to be at or near the DC load value required. The rectifier output signal may include residual high frequency ripple AC voltage at 18 times the commanded inverter output frequency fo. The DC load filter volume required to reduce AC ripple voltage is proportional to ripple frequency. The higher the incoming ripple frequency, the smaller the filter volume. Existing 12-pulse rectifiers connected to the fixed 60 Hz AC line, with inherent 720 Hz ripple (12*60 Hz), has poor characteristics for even a 5% AC output ripple voltage requirement resulting in large Ldc-Cdc filter volume being approximately ⅔ of the entire sectional cabinet, high weight, high cost and lossy inductors. Table 1 below shows a comparison of AC ripple frequency for 12, 18 and 24 pulse rectifiers with various incoming AC frequencies.

TABLE I

Comparison of bridge output AC ripple frequency for 12, 18 and 24 pulse rectifiers

| Transformer Primary | Rectifier Type | | | | | |
|---|---|---|---|---|---|---|
| | 12-Pulse | | 18-Pulse | | 24-Pulse | |
| Frequency | [Hz] | [pu] | [Hz] | [pu] | [Hz] | [pu] |
| 60 | 720 Hz | 1x | 1,080 Hz | 1.5x | 1,440 Hz | 2x |
| 180 | — | — | 3,240 Hz | 4.5x | 4,320 Hz | 6x |
| 600 | — | — | 10,800 Hz | 15x | 14,400 Hz | 20x |

Utilizing an 18 or 24 pulse configuration with inverter output frequency fo=60 Hz can reduce filter volume by 1.5× to 2.0× respectively, compared to the 12 pulse rectifier with 60 Hz AC line. A more significant reduction occurs with higher inverter fo so AC ripple voltage reduction of 4.5× to 6.0× occurs using fo=180 Hz with 18 or 24 pulse configurations, respectively, and AC ripple voltage reduction of 15× to 20× occurs using fo=600 Hz maximum frequency allowed due to control board processor limitation with 18 or 24 pulse configurations, respectively. While the 24 pulse configuration can be utilized for an absolute lowest AC ripple voltage, the extra transformer windings and rectifier cost will be higher. An 18 pulse configuration with high inverter fo is a significant advance in technology over existing 12 pulse SCR-based methods, while being lower in cost.

In disclosed examples, the rectifier bridge output is a galvanic isolated, controllable and variable DC component voltage. AC ripple remaining on the fundamental DC component is attenuated further by the next power flow stage component block consisting of a unique inventive $L_{dc\_1}$-$C_{dc}$-$L_{dc\_2}$ filter to obtain an ultra-low AC ripple voltage required for DC loads, especially E-coat type applications. Inductors $L_{dc\_1}$ & $L_{dc\_2}$ form a center tapped inductor integrated into one core with ½ $L_{dc\_1(+)}$ inserted in (+) rectifier output leg and ½ $L_{dc\_1(-)}$ inserted in (-) rectifier output leg. Likewise, ½ $L_{dc\_2(+)}$ inserted in (+) DC load output leg and ½ $L_{dc\_2(-)}$ inserted in (-) DC load output leg. The ½ $L_{dc\_1(+)}$ and ½ $L_{dc\_1(-)}$ and output DC capacitor $C_{dc}$ form a differential mode L-C filter to attenuate rectifier output AC ripple voltage on the DC load to ultra-low levels. If inverter common mode current $I_{cm}$ noise is not totally captured by the transformer ESS, the choke also functions as a secondary common mode component to reduce high frequency current entering the plating solution 4 of the E-coat tank ($R_{solution}$) to cathode ground. In this case, ½ $L_{dc\_1(+)}$ and ½ $L_{dc\_2(+)}$ together with $R_{solution}$ form an L-R attenuator circuit to ground in the (+) terminal leg. Likewise, ½ $L_{dc\_1(-)}$ and ½ $L_{dc\_2(-)}$ together with $R_{solution}$ form an L-R attenuator circuit to ground in the (-) terminal leg.

Each anode rectifier output section may interact with DC load side transients from adjacent anode rectifier outputs when a workpiece transitions between two sections. Inductors ½ $L_{dc\_2(+)}$ and ½ $L_{dc\_2(-)}$ with output DC capacitor $C_{dc}$ form a differential mode L-C filter to attenuate DC load side transients from destabilizing $C_{dc}$ output voltage as a feedback reference signal to the PWM inverter 101. Also ½ $L_{dc\_1(+)}$ and ½ $L_{dc\_2(+)}$ together with $R_{solution}$ form an L-R attenuator circuit to the capacitive ESS shield ground in the (+) terminal leg. Likewise, ½ $L_{dc\_1(-)}$ and ½ $L_{dc\_2(-)}$ together with $R_{solution}$ form an L-R attenuator circuit to the capacitive ESS shield ground in the (-) terminal leg. This eliminates any load side transients from crossing over to the transformer primary where electronic components are. As shown in FIG. 5 above, the anode DC and AC ripple current characteristics for existing 12-pulse SCR approaches with 5% maximum AC ripple provide severe disadvantages compared to the use of the inverter-based converters 100, for example, using fo=180 Hz with 0.14% AC ripple which are approximately 30× better than the 12-pulse SCR approach.

Figure 12:
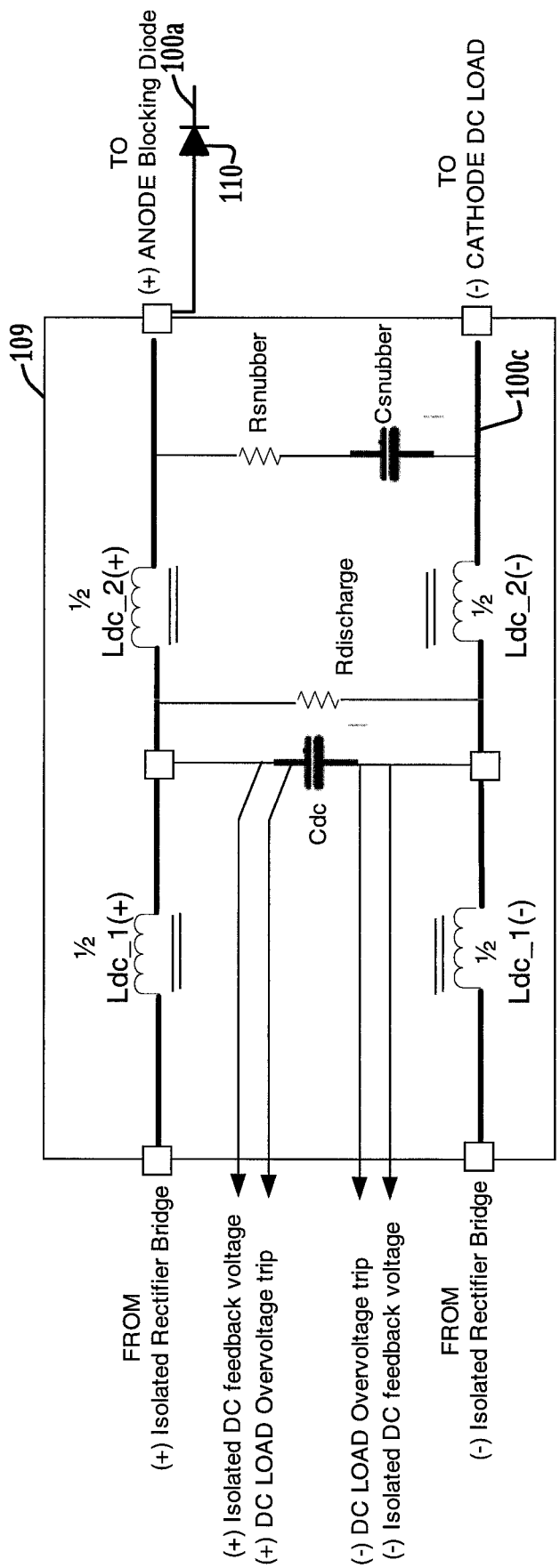
FIG. 12 is a schematic diagram showing components used in one embodiment of a DC output filter.

FIG. 12 illustrates an example output filter embodiment 109 which can be used in the individual converters 100. The example output filter 109 is a differential structure including first and second inputs receiving the DC rectifier output signal, as well as first and second outputs to provide the filtered DC rectifier output signal. A first (+) input is connected to a first (+) output via two series connected inductors having values 0.5 Ldc_1 and 0.5 Ldc_2, and the second (-) input is connected to the second (-) output via series connected inductors having values 0.5 Ldc_1 and 0.5 Ldc_2. A capacitor Cdc and a discharge resistor Rdischarge are connected in parallel with one another between the nodes joining the upper and lower circuit branches of the output filter 109, and the first and second terminals of the capacitor Cdc provide the DC load overvoltage trip feedback signal and the isolated DC feedback voltage signal to the system controller (FIG. 7 above).

The filter circuit 109 also includes a number circuit connected across the two outputs, including a series combination of a number resistor Rsnubber and a number capacitor Csnubber. In operation, the output filter 109 rejects or suppresses AC ripple voltage on the DC load or output terminals. The input to the filter circuit 109 in one example is from the 18 pulse rectifier output (FIG. 11), and the filter components are chosen in one example according to the high-frequency AC ripple at the output of the diode rectifier 108. In the illustrated example, the filtered DC output signal (+) from the first output terminal is coupled to an anode of the blocking diode 110, and the (-) terminal 100c is connected to the common cathode of the system (FIG. 1), which is electrically connected to the cathode plating terminal in the tank plating solution 4. In the illustrated example, the average DC output has AC ripple voltage of less than 0.15% of the set point voltage at any load, representing a significant improvement over the 12-pulse SCR-based plating systems.

In one example, moreover, the differential filter cutoff frequency using ($L_{dc\_1\ (+)}+L_{dc-1(-)}$) and $C_{dc}$ is set to allow only average DC voltage to pass while attenuating the inverter PWM cutoff frequency fc and higher frequency voltage components as well as rectifier components of 18*fo. The ($L_{dc-2(+)}+L_{dc-2(-)}$) and $C_{dc}$ has a differential filter cutoff frequency set to reject the inverter PWM cutoff frequency fc and higher frequency voltage components as well as rectifier components of 18*fo that might enter the tank load terminals from adjacent anode rectifiers. In certain implementations, the inductors of the output filter 109 are integrated into one magnetic structure. The $R_{snubber}\ C_{snubber}$ circuit in one example is a microsecond time frame filter used only to control the output anode blocking diode reverse recovery voltage spike to levels less than breakdown values. For example, voltage spikes can occur if the anode diode was conducting full load current and an adjacent rectifier at a higher VDC voltage level commutates the anode diode abruptly off. The discharge resistor $R_{discharge}$ in combination with the capacitor are designed in one example designed to discharge the output capacitor to safe touch potential levels (e.g., less than 50 V) in 50 seconds, if all anode rectifier power is removed. The output capacitor $C_{dc}$ voltage is measured and isolated from earth ground and is used as a voltage feedback to the PID voltage loop regulator in the system controller (FIG. 7) with its electronics referenced to earth ground. The voltage of the output capacitor $C_{dc}$ is measured and is provided as a feedback signal to an over-voltage trip circuit referenced to the capacitor (−) terminal circuit. In one example, if the instantaneous output capacitor voltage exceeds a maximum allowed value (e.g., based on allowable component ratings), the circuit generates an over-voltage trip signal that removes all input and output anode rectifier power.

Differential DC link filter inductance $L_{DC\_in}$ of one embodiment may be physically split, placing ½ $L_{dc\_in}$ differential inductance in a coil located in the (+) DC link side and another coil with ½ $L_{dc\_in}$ in the (−) DC link side (e.g., FIG. 12 above). The filter inductor $L_{DC\_in}$ and $C_{dc\_in}$ DC bus capacitor in one example attenuate any 6-pulse bridge 360 Hz ripple to tolerable non-critical values, since there is another filter downstream in the topology which will remove any 6-pulse ripple voltage remaining. The DC link filter inductor inherently includes common mode coil air core inductance $L_{cm\_in}$ since the coils are physically split in the (+) and (−) DC rails. The $L_{cm\_in}$ inductance may be increased by passing both (+) and (−) DC link wires through an additional core with both wires wound in the same direction. The $L_{cm\_in}$ inductance and $C_{cm\_in}$ capacitors, added from the (+) DC bus to chassis ground and (−) DC bus to chassis ground in each section, together form a common mode noise filter, which has a two-fold purpose. The first is to attenuate incoming AC input line to ground transient voltage spikes before entering the E-coat tank where arcing may occur. Standard practice is to utilize metal oxide varistors (MOVs) on the AC line input to ground to clamp the maximum spike voltage value to 3.5× peak line voltage. $L_{cm\_in}$ inductance and $C_{cm\_in}$ capacitors further attenuate high frequency line-to-ground transient magnitude but also slow down the voltage rate of rise to low values to prevent nuisance tripping of internal electronics. The second purpose of $L_{cm\_in}$–$C_{cm\_in}$ filter is to capture inverter output common mode capacitive noise current to ground due to inverter switching, and return it back to the (+) or (−) DC source via bypass capacitors $C_{cm\_in}$ and using $L_{cm\_in}$ to block inverter noise current from entering the AC input grid backwards through the DC link, 6-pulse bridge and AC line input to ground path.

Figure 13:
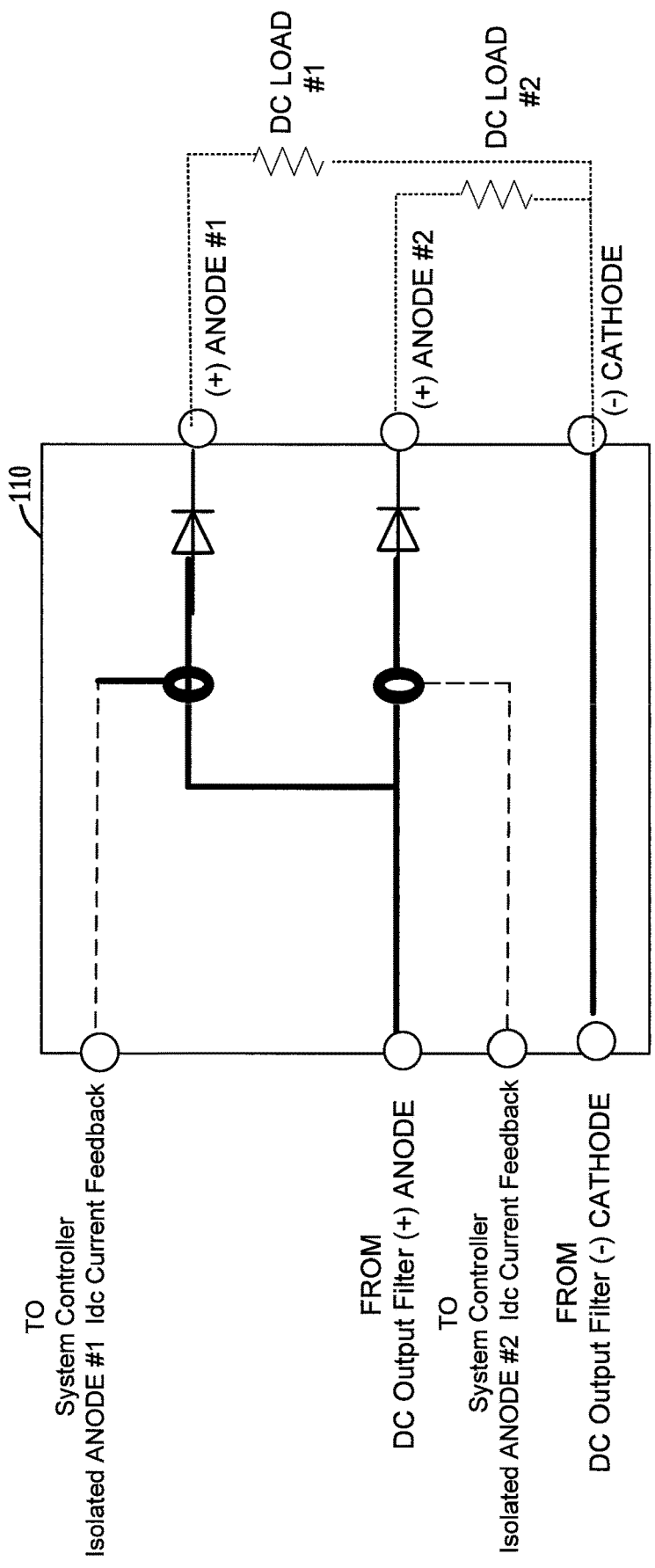
FIG. 13 is a schematic diagram showing components used in one embodiment of an output anode blocking diodes block and associated current feedback.

FIG. 13 illustrates an example of the blocking diode circuit 110 which may be used in the system of FIGS. 1 and 7 above. This example includes two (+) anodes spaced on either side of the cathode workpiece frame (−), with anode distances adjusted to get equal plating current in each load anode circuit labeled DC load #1 and DC load #2 in FIG. 13. In this example, moreover an isolated current feedback signal from each anode is sent to the system controller (FIG. 7). In operation in one implementation, if one or both anode currents is greater than a corresponding predefined (e.g., customer configurable) maximum set point value, the system controller reduces inverter output voltage, until the anode currents fold back to the desired maximum values. In this regard, frequent application in the first three sections or stages of the multi-stage process (e.g., FIGS. 1 and 4) when an un-plated vehicle workpiece first arrives. Another current fold back condition may occur if the tank solution 4 accumulates metal particles or weld spurs broken off the vehicle workpiece causing a low resistance or short circuit conditions within the tank 2.

Referring also to FIGS. 14-19, waveforms are illustrated corresponding to power flow through the system of the example converter modules 100 (e.g., FIG. 7) in operation of the system of FIGS. 1 and 4. FIG. 14 provides a graph 1400 showing example input AC utility line 50/60 Hz line to line voltage curve 1402 and utility phase current curve 1404 measured at the AC input 112 (FIG. 7) resulting from the internal 6 pulse diode DC front end of one anode rectifier module. While power factor at this utility point of common coupling has a power factor of approximately 0.92 over most output DC loading, AC line current harmonics are close to approximately 30% current harmonic distortion for most DC loads. FIG. 15 shows a graph 1500 including the commanded adjustable and variable PWM inverter line-to-line output voltage curve 1502 at the new desired higher output fundamental frequency fo with carrier frequency fc component voltage. The 6 pulse input diode rectifier creates a DC bus voltage that is modulated (e.g., inverted) with the inverter switches operating at fc to create the required PWM line-to-line voltage at the output of the inverter 101. This three phase voltage is passed to the input of the sinewave filter 106, where the carrier frequency fc component voltage is suppressed, leaving only the quasi-sinusoidal, adjustable and variable fundamental fo of one of three line-to-line voltages at the filter output, shown as curve 1504 in FIG. 15. The graph 1500 in FIG. 15 also shows a curve 1506 illustrating the inverter DC bus voltage in the inverter 101.

Figures 16, 17:
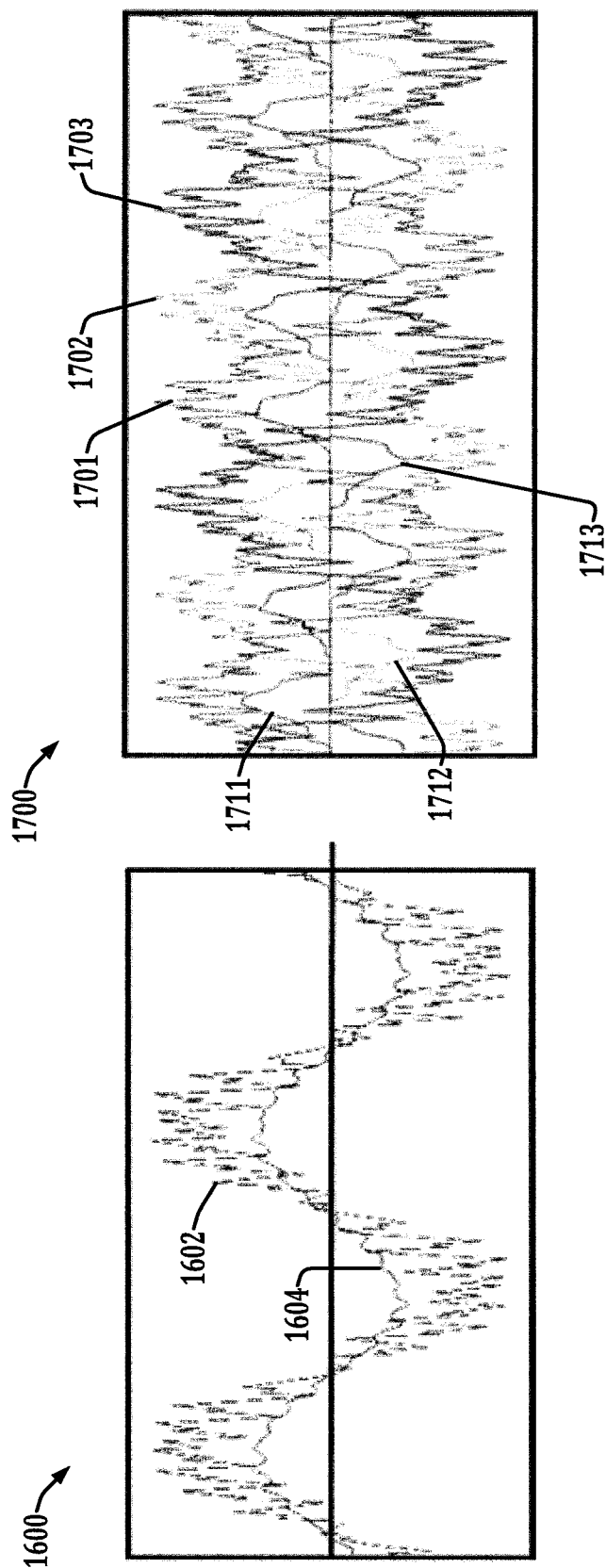

FIG. 16 shows a graph 1600 illustrating the quasi-sinusoidal, adjustable and variable output frequency voltage curve 1602 for one of three line-to-line voltage outputs from the sinewave filter 106, which is applied to the input delta primary winding of the 18 pulse isolation transformer 107. The transformer primary current curve 1604 illustrates one example phase current, which is sinusoidal with low harmonic distortion due to the 18 pulse rectifier operation. Since both the voltage and the current have low harmonic content, standard available transformer lamination thickness iron can be used to reduce system cost. In one example, the transformer primary to secondary turns ratio can be unity, step-down or step-up, depending on application requirements.

Figure 19:
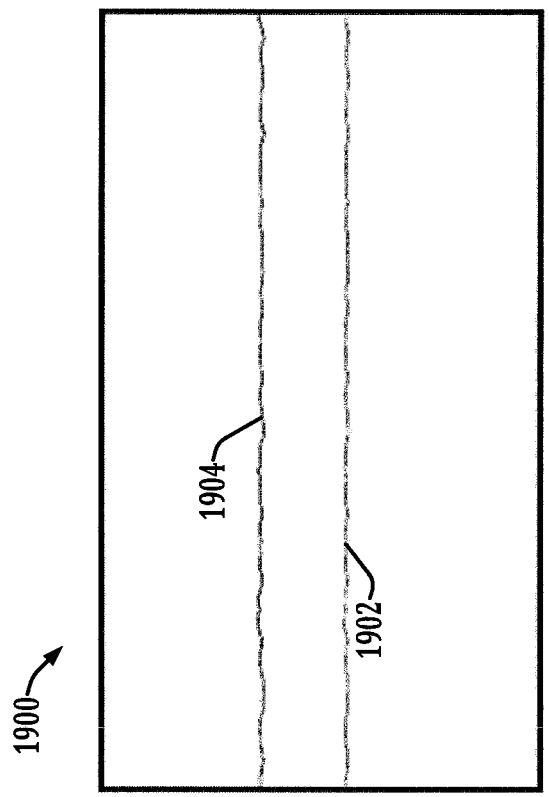
Figure 18:
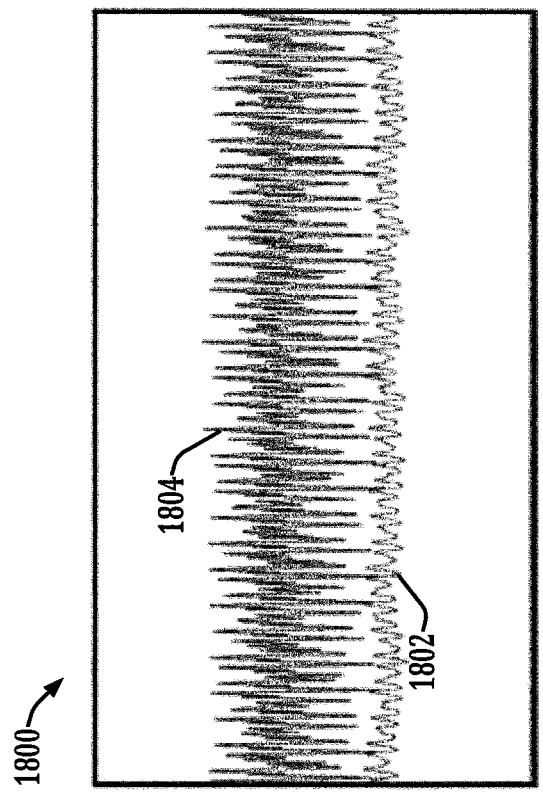

FIG. 17 provides a graph 1700 showing the input three quasi-sinusoidal, adjustable and variable fundamental fo line-line voltage curve 1701, 1702 and 1703 across the delta primary winding of block the isolation transformer 107, along with three of the nine-phase AC currents in (curves 1711, 1712 and 1713) in the isolation transformer secondary output. Block 107 secondary nine-phase voltages are applied to input of block 108 18 pulse diode rectifier to create a DC average output voltage and average current on block 108 output. FIG. 18 provides a graph 1800 illustrating a curve 1804 showing the average DC output voltage from the multi-pulse diode bridge rectifier 108 with high frequency ripple AC ripple voltage at 18*fo, as well as curve 1802 showing the output ripple current from the rectifier 108. The peak to peak ripple magnitude on the average DC voltage output is somewhat high since only the waveform voltages near the peak of the nine phase inputs are rectified. However, since the ripple voltage is at a frequency of 18*fo, it is easily filtered by the output filter 109 as shown in FIG. 19. For example, at 450 Vdc average 18 pulse bridge rectifier output, the peak-peak AC ripple at 18*fo is approximately 200 Vpk-pk. Likewise, 18 pulse bridge rectifier current shown in curve 1802 has an average DC current value with some high frequency AC ripple current that is filtered by the output filter 109. FIG. 19 provides a curve 1900 showing the average DC output anode to cathode load voltage in curve 1904, as well as the average DC output anode load current curve 1902. The output signals 1902 and 1904 from the output filter 109 have virtually no high frequency ripple AC ripple content, with typical AC ripple values less than 0.15% of the set point DC voltage, thus representing a significant advantage over SCR-type DC supplies, particularly for electroplating processes or other applications requiring low ripple content.

Figure 20:
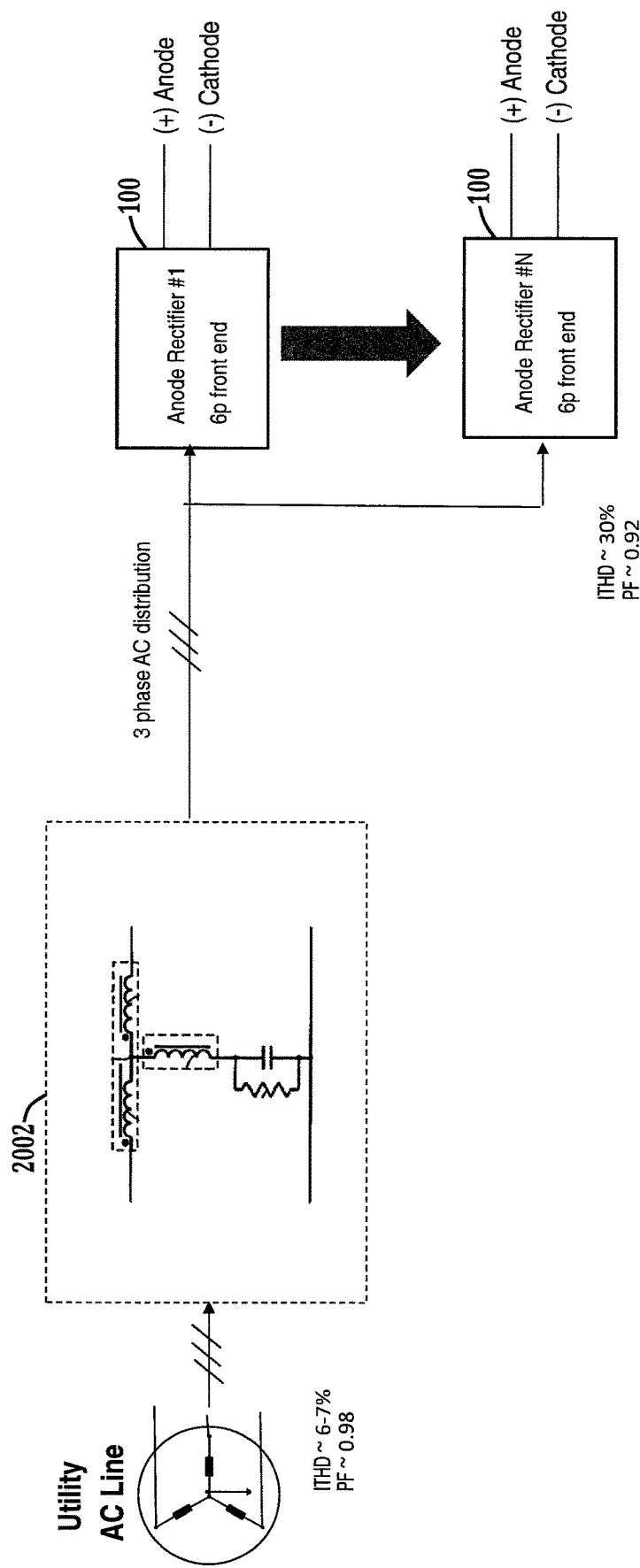
FIG. 20 is a system diagram showing 16 anode rectifier section loads.
Figure 21:
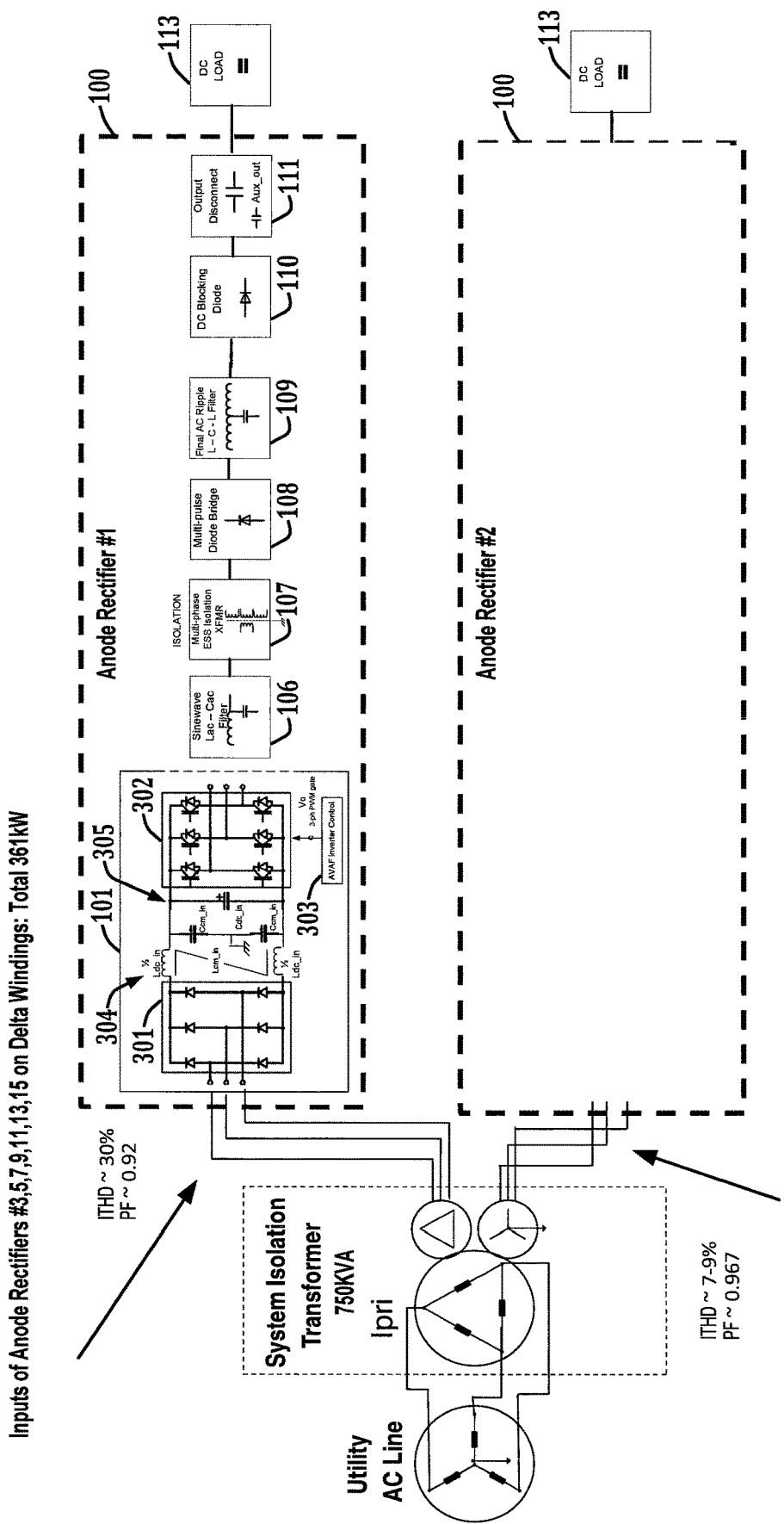
FIGS. 21 and 22 are system diagrams showing system configuration in which two groups of eight anode rectifier section loads are selected.
Figure 22:
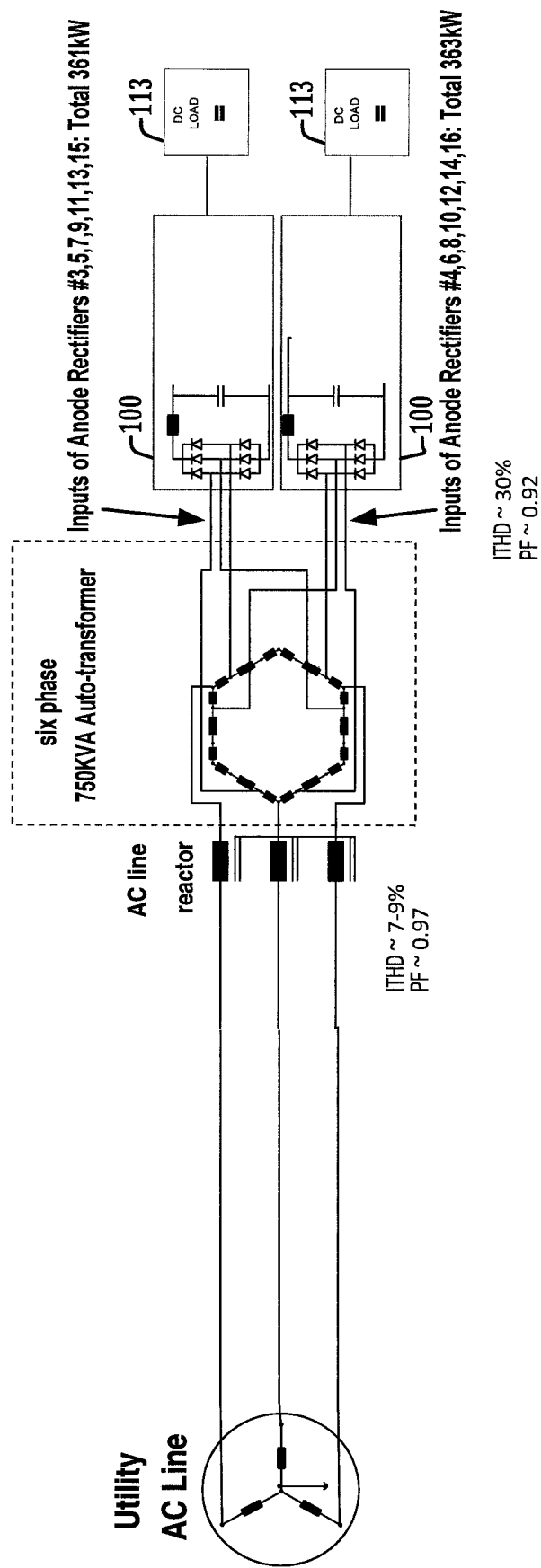
Figure 23:
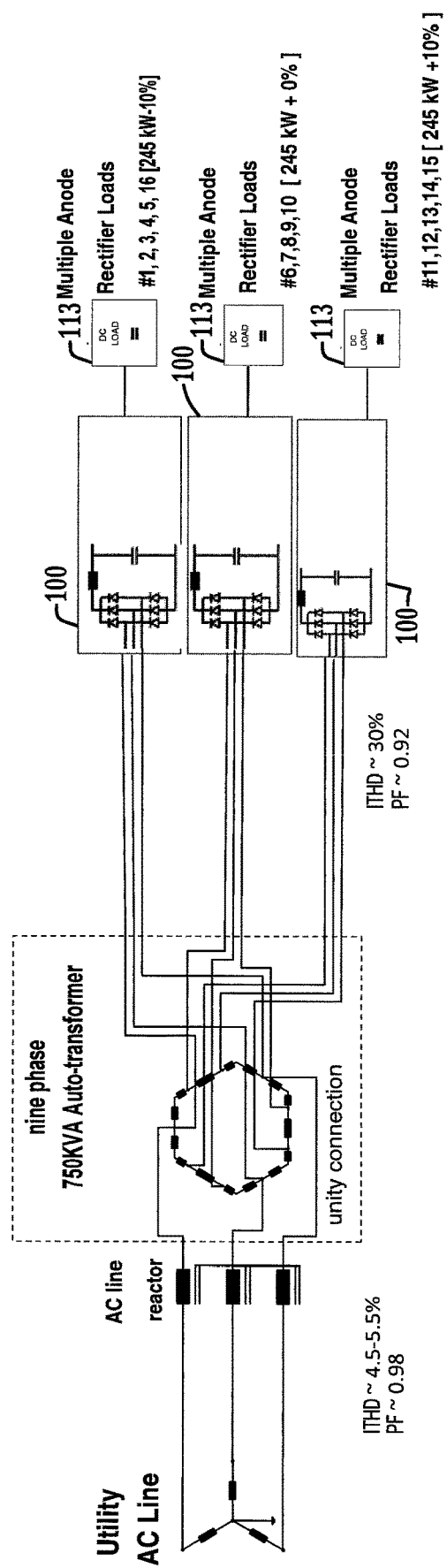
FIG. 23 is a system diagram showing system configuration where three groups of five anode rectifier section loads are selected.

FIGS. 20-23 illustrate various system configurations. FIG. 20 shows an example system configuration using a three phase AC distribution to a number of converter loads 100 (e.g., 16 in one example). In one implementation, the power distribution supplies a total of 724 kW, and includes a broadband harmonic filter 2002. One suitable filter 2002 is described in U.S. Pat. No. 6,549,434, incorporated herein by reference. In one example, the filter 2002 advantageously facilitates improved power factor, such as an increase to 0.98 from 0.92 for a single anode rectifier section and reduced current total Harmonic distortion from 30% down to approximately 6-7%. FIG. 21 shows another possible system configuration in which two groups of eight anode rectifier section loads (converters 100) are specially selected (e.g., odd sections in one group and even sections and another group). In this configuration, a total load of approximately 361 kW is attached to a Delta–Wye full kVA isolation transformer, for example, as shown in U.S. Pat. No. 8,299,732, incorporated herein by reference. In this type configuration, power factor can be increased to 0.97 from 0.92 for a single anode rectifier section and the current total harmonic distortion can be lowered from 30% to approximately 7-9%. Another example system configuration is shown in FIG. 22, in which two groups of eight anode rectifier loads (e.g., converters 100) are specially selected, totaling approximately 361 kW, and are attached to a six-phase transformer. One suitable example is shown in U.S. Pat. No. 8,299,732. In this example, the utility power factor can be increased to 0.967 from 0.92 for a single anode rectifier section and the current total Harmonic distortion can be lowered from 30% down to approximately 7-9%. FIG. 23 shows another system configuration example in which three groups of five anode rectifier section loads (e.g., converters 100) are specially selected, totaling approximately 245 kW, and are attached to a nine-phase transformer as shown in U.S. Pat. No. 8,299,732. In this further example, the utility power factor can be increased to 0.96 or 0.98 from 0.92 for a single anode rectifier section and the current total Harmonic distortion can be lowered from 30% down to approximately 4.5-5.5%.

As seen in FIGS. 20-23, another advantage of the disclosed systems is that the relative DC load kW value of each converter 100 section referred to the AC utility side is relatively constant and equal over the 16 operational sections, even though voltage and current are changing section to section. This provides approximately equal loading effect at the section inputs, and allows grouping anode rectifier input sections to facilitate harmonic mitigation solutions with low current total Harmonic distortion values. Table 2 below shows utility kW loading if all 16 sections of FIG. 4 are applied on a common AC bus input (e.g., FIG. 20). Table 3 shows utility kW loading if an appropriate combination of anode rectifier input sections are grouped into two equal loading groups as for 12 pulse operation. Table 4 shows utility kW loading if an appropriate combination of anode rectifier input sections are grouped into three equal loading groups as for 18 pulse operation.

TABLE 2

All 16 rectifier sections for Common AC Bus
GROUP 1 COMBINATION

| rectifier | kW | rectifier | kW |
|---|---|---|---|
| 1 | 13 | 2 | 34 |
| 3 | 40 | 4 | 45 |
| 5 | 51 | 6 | 43 |
| 7 | 50 | 8 | 51 |
| 9 | 53 | 10 | 48 |
| 11 | 59 | 12 | 60 |
| 13 | 50 | 14 | 50 |
| 15 | 45 | 16 | 32 |
| sum = | 361 | sum = | 363 |
| TOTAl kW | 724 | | |

TABLE 3

Two Groups of 8 rectifier sections for 12 pulse Mitigation

| GROUP 1 COMBINATION | | GROUP 2 COMBINATION | |
|---|---|---|---|
| rectifier | kW | rectifier | kW |
| 1 | 13 | 2 | 34 |
| 3 | 40 | 4 | 45 |
| 5 | 51 | 6 | 43 |
| 7 | 50 | 8 | 51 |
| 9 | 53 | 10 | 48 |
| 11 | 59 | 12 | 60 |
| 13 | 50 | 14 | 50 |
| 15 | 45 | 16 | 32 |
| sum = | 361 | sum = | 363 |

TABLE 4

Three Groups of 5 rectifier sections for 18 pulse Mitigation

| | | | | GROUP 1 COMBINATION | | GROUP 2 COMBINATION | | GROUP 3 COMBINATION | |
|---|---|---|---|---|---|---|---|---|---|
| rectifier | kW | rectifier | kW | rectifier | kW | rectifier | kW | rectifier | kW |
| 1 | 13 | 2 | 34 | 1, 2, 3, 4, 5, 16 | | | | | |
| 3 | 40 | 4 | 45 | | | | | | |
| 5 | 51 | 6 | 43 | | | 6, 7, 8, 9, 10 | | | |
| 7 | 50 | 8 | 51 | | | | | | |
| 9 | 53 | 10 | 48 | | | | | | |
| 11 | 59 | 12 | 60 | | | | | 11, 12, 13, 14, 15, | |
| 13 | 50 | 14 | 50 | | | | | | |
| 15 | 45 | 16 | 32 | | | | | | |
| | | | | sum = | 215 ~−10% | sum = | 245 ~0% | sum = | 264 ~+10% |

FIG. 20 shows System Configuration if all 16 anode rectifier section loads, similar to AC/DC converter 100 and totaling 724 kW as in Table 2, are attached to a single passive broadband Harmonic filter as shown in U.S. Pat. No. 6,549,434. In this example, the utility power factor can be increased to 0.98 from 0.92 for a single anode rectifier section and I_THD % lowered from 30% down to ~6-7%. This filter eliminates $5^{th}$ and $7^{th}$ harmonic current content of block 100 6 pulse anode rectifier. FIG. 21 shows System Configuration if two groups of 8 anode rectifier section loads, similar to AC/DC converter 100 and totaling ~361 kW as in Table 3, are attached to a Delta Wye Full kVA Isolation transformer as shown in U.S. Pat. No. 8,299,732. Group 1 is eight specially selected anode rectifiers that are a combination of #1,3,5,7,9,11,13,15 converter 100 inputs totaling 361 KW and Group 2 is eight specially selected anode rectifiers that are a combination of #2,4,6,8,10,12,14,16, converter 100 inputs totaling 363 KW. In this case, since there is approximately equal loading on the added input transformer Delta and Wye secondaries, the utility side $5^{th}$ and $7^{th}$ current harmonics are cancelled, even though all secondary loads are isolated. FIG. 21 shows utility power factor can be increased to 0.967 from 0.92 for a single anode rectifier section and I_THD % lowered from 30% down to ~7-9%. One advantage of the configuration in FIG. 21 is greatest for new plants that would require a separate anode rectifier load isolation transformer from other customer loads. Rather than have a single Delta-primary Wye-secondary of full 724 kW rating, the two Delta and Wye secondary windings of 363 kW are available at a low cost, while simultaneously providing both power factor and harmonic I_THD minimization.

FIG. 22 shows System Configuration if two groups of 8 anode rectifier section loads, similar to AC/DC converter 100 and totaling ~361 kW as in Table 3, are attached to a six phase transformer as described in U.S. Pat. No. 8,299,732. Group 1 in this example is eight specially selected anode rectifiers that are a combination of #1,3,5,7,9,11,13,15 block 100 inputs totaling 361 KW and Group 2 is eight specially selected anode rectifiers that are a combination of #2,4,6,8, 10,12,14,16, block 100 inputs totaling 363 KW. In this case, since there is also approximately equal loading on the transformer secondary outputs, and the utility side $5^{th}$ and $7^{th}$ current harmonics are cancelled, even though all secondary loads are isolated. FIG. 22 shows utility power factor can be increased to 0.97 from 0.92 for a single anode rectifier section and I_THD % can be lowered from 30% down to approximately 7-9% as similar to the delta wye isolation transformer case. An advantage of the configuration of FIG. 22 is greatest for older retrofit plants that that already have a separate single full kVA rated anode rectifier load isolation transformer. A fully rated six phase transformer is approximately half the size, weight and cost of a full isolation transformer, while simultaneously providing both power factor and harmonic I_THD minimization and can be inserted as post-sale extra harmonic mitigation expense if required.

FIG. 23 shows another configuration where three groups of 5 anode rectifier section loads (e.g., converters 100) and totaling ~245 kW as in Table 4, are attached to a nine phase transformer for example, as shown in U.S. Pat. No. 8,299, 732. Group 1 is five specially selected anode rectifiers that are a combination of #1,2,3,4,5 and 16 converter 100 inputs totaling 215 KW and Group 2 is five specially selected anode rectifiers that are a combination of #6,7,8,9,10 converter 100 inputs totaling 245 KW and Group 3 is five specially selected converters 100 that are a combination of #11,12,13,14,15 converter 100 inputs totaling 264 KW. In this case, since there is approximately equal loading within +/−10% on all of the transformer secondary outputs, the utility side $5^{th}$ and $7^{th}$ current harmonics are cancelled, even though all secondary loads are isolated. FIG. 23 shows Utility power factor can be increased to 0.96 or 0.98 from 0.92 for a single anode rectifier section and I_THD % lowered from 30% down to approximately 4.5-5.5% similar to a nine phase isolation transformer case with delta primary and secondary windings of +20 degree, 0 degree, and −20 degree. one advantage of FIG. 23 configuration is greatest for older retrofit plants that that already have a separate single full kVA rated anode rectifier load isolation transformer. A fully rated nine-phase transformer is also approximately half the size, weight and cost of a nine phase full isolation transformer, while simultaneously providing both power factor and harmonic I_THD minimization and can be inserted as post-sale extra harmonic mitigation expense if required.

The present disclosure provide significant advantages compared with 12-pulse SCR-type DC power supplies, particularly for electroplating and other applications in which low ripple levels are desired. For example, use of a 6-pulse full wave diode bridge on each section connected to a common AC line bus can achieve a desirable high power factor from light to full load, thereby avoiding or mitigating the low power factor disadvantage of phase control 12-pulse rectifier systems with firing angle control phased back from the full on condition. The 6-pulse full wave bridge with a DC link filter also eliminates disadvantage is relating to SCR commutation failures and susceptibility to power quality sags, surges and transients, since the DC link filter energy provides ride-thru protection without tripping the conversion system off-line. A fixed DC bus potential positioned before the PWM inverter 101, moreover, allows for a separate non-isolated DC input source connection eliminating 12-pulse rectifier disadvantage, as long as incoming average DC voltage is higher than the required DC link value required to regulate output DC voltage from the follow-on PWM inverter. Various alternative embodiments for a common DC bus input source are possible. One suitable common DC bus approaches described in U.S. Pat. No. 6,335,872, incorporated herein by reference, with a reference to a nine phase transformer with primary connected to the 60 Hz AC line and secondary feeding an 18 pulse diode bridge and DC link inductor with (+) and (−) terminals sized for the combined kW of all E-coat rectifier sections. In this case, (+) and (−) bus terminals are connected directly to the $C_{dc\_in}$ capacitor in each section, with the 6-pulse bridge and $L_{dc\_in}$ inductor is removed. Another suitable common DC bus concept is described in U.S. Pat. No. 6,198,647, incorporated herein by reference, including a 12 phase transformer with a primary connected to the 60 Hz AC line and secondary feeding a 24-pulse diode bridge and DC link inductor with (+) and (−) terminals also sized for the combined kW of all rectifier sections and (+) and (−) bus terminals connected to each $C_{dc\_in}$ capacitor, with 6-pulse bridge and $L_{dc-in}$ inductor removed. Still another suitable common DC bus concept is to apply an active front end (AFE) rectifier connected to the AC line and AFE DC output regulating the DC voltage on the combined $C_{dc\_in}$ capacitors of all sections. These three connections maintain unity power factor to the AC line, while simultaneously reducing AC line current total harmonic distortion (e.g., approximately 3.5%) to less than 5% limit as established by IEEE Standard 519.

The fixed DC bus voltage magnitude that is further DC link $L_{DC\_in}$–$C_{dc\_in}$ filtered is regulated by power semiconductor switching and control. The inverter 101 creates an adjustable 3-phase PWM AC output voltage ($V_o$), with a fundamental voltage that is proportional to the desired or commanded DC load magnitude. One suitable technique is described in U.S. Pat. No. 7,626,836, incorporated herein by reference, which illustrates adjustable voltage/adjustable frequency (AV/AF) inverter control, in which a desired fundamental inverter AC output frequency ($f_o$) and be set as a reference value that is constantly maintained. A scaled voltage reference command ($V_{cmd}$) signal (e.g. 0-10 V) is given to the AV/AF control corresponding to a desired zero to 3-phase maximum output voltage from the inverter, using standard PWM switching techniques at carrier frequency fc. In certain implementations, the inverter output frequency and voltage sent to the follow-on isolation transformer primary now has a fundamental frequency that can adjusted up relative to the line frequency. For example, certain implementations provide inverter operation to generate the first AC signal at a frequency of 180-600 Hz, which represents a possible tenfold increase in frequency over the previous fixed 60 Hz AC line feeding the 12-pulse isolation transformer. This eliminates a disadvantage of the 12-pulse AC/DC conversion topology since the magnetic core volume is proportional to applied frequency.

The blocking diode or diodes 110 from the (+) DC filter output to the (+) anode exit terminal facilitate the use of each converter 100 as a floating DC supply with a cathode reference. The majority of anode rectifier high current passes directly between tank anode structure 10 to the cathode workpiece 3 when under that section. However, there is another path to adjacent anode rectifier sections when the workpiece 3 is between sections with current limited by the E-coat solution resistance path. Also, each follow on section is set for a higher DC anode voltage set point as shown by the voltage profile curve 404 in FIG. 4 above, by at least 50 Vdc, as the workpiece 3 proceeds along the process direction PD. Addition of a series blocking diode 110 prevents this adjacent current flow since it would become reverse biased from the higher DC voltage of the next section. The diode 110 thus improves controllability of each individual output $C_{dc}$ capacitor voltage with its sectional voltage feedback loop. This diode 110 may be omitted for a single E-coat or plating station.

The methodology to properly control the individual converters 104 the collective system in certain examples may include three regulating loops, various set point references and feedback signals, and interface to an existing control. One suitable example is shown in U.S. Pat. No. 7,626,836, incorporated herein by reference. One control function is to regulate the DC load magnitude at the output (+) anode & (−) cathode terminals to a desired DC voltage reference setpoint input to the system controller included in each converter 100 (FIG. 7). The DC feedback signal or signals 100f for each converter 100 are derived from the anode side of the series output blocking diode 110 for each converter 100. Output filter inductors ½ $L_{dc\_2(+)}$ connected to the anode of the series blocking diode and ½ $L_{dc\_2(-)}$ connected to the (−) cathode terminal, function as AC noise filters and drop little DC voltage. Accordingly, the most stable and noise free DC voltage feedback signal is measurement across the $C_{DC}$ output filter capacitor. However, the system controller low voltage electronics in certain examples is earth referenced to ground and power structure DC voltage has a floating reference potential to earth ground, so the $C_{DC}$ output filter capacitor DC signal voltage is isolated in the illustrated example.

In one example, as shown in FIGS. 7 and 12, two DC measurements are made across the $C_{DC}$ output filter capacitor. A first $C_{DC}$ measurement is made for an E-coat emergency fail safe backup purpose (E-stop). A resistive voltage divider across $C_{DC}$ derives a scaled voltage proportional to the DC load output and compares this value to a maximum allowable destruct overvoltage trip reference. If exceeded, a latching isolated relay contact is energized to the system controller that takes appropriate action to remove all circuit power at both AC Line input and/or DC load output contactors. Thus, all power is removed in case of feedback device failure, controller electronic failures or power structure failures that could possibly turn the output load to a full on overvoltage condition. As one example using a 480V ac input line, peak output load could reach 650 Vdc on 500 Vdc rated capacitors causing explosion. Another example is peak output load could reach 650 Vdc on the E-coat solution, which from past history, forms hydrogen and oxygen bubbles which may explode or cause tank fire if overvoltage's >400 Vdc are maintained. A second $C_{DC}$ output filter capacitor DC measurement is made for the system controller voltage regulation control using an isolated voltage transducer block across $C_{DC}$. A scaled feedback voltage signal from the voltage transducer block is fed into the system controller block. A PID control in the system controller compares the DC voltage reference set point with the isolated and scaled dc feedback voltage. The PID output error signal is a scaled 0-10 Vdc signal voltage command ($V_{cmd}$) is input to the adjustable voltage/adjustable frequency (AVAF) controller. One suitable example is illustrated in U.S. Pat. No. 7,626,836, incorporated herein by reference. The PID in one example is digital based or analog hardware PID controllers can be used. The AVAF controller in one example contains various input signals, various feedback signals for voltage and current control loops, and one output voltage control command (Vo).

One of the input signal commands is inverter switching frequency or carrier frequency fc, for example a onetime fixed input parameter corresponding to the desired (fc) of the PWM inverter power structure semiconductors. Ideally a high carrier frequency is used in order to yield the lowest possible AC ripple across the DC load. Practically, high power structures have low carrier frequency fc (e.g., 2 kHz) while low power structures can may have higher carrier frequency fc (e.g., 12 kHz) without severe power structure current de-rating. Another control input is the fundamental output frequency (fo) for operating the inverter 101. This value can also be a onetime fixed input parameter corresponding to the desired fundamental output frequency (fo) of the PWM AC voltage coming out of the inverter power structure 101. In other examples, the inverter output frequency can be adjustable. Ideally, a relatively high operating frequency fo value is used, resulting in lowest possible AC ripple across the DC load. In certain examples, the control processor may have computational limitations resulting in a fo upper limit of 600 Hz, although not a strict requirement of all implementations. In addition, in order to obtain tight control of the DC load under transient step conditions, fc should be approximately 10×*fo. The carrier frequency fc is typically 4 KHz without current de-rating in an E-coat medium power inverter, so one preferable fo upper limit would practically be approximately 400 Hz.

The primary voltage regulator loop to control the average DC load voltage across Cdc output capacitor which has an isolated DC feedback signal that is compared to the desired DC load voltage reference in a system controller PID loop. The PID output error signal Vcmd is an input signal command into AVAF control which adjusts 3-phase PWM gating signals to the inverter semiconductors such that inverter 3-phase AC output fundamental voltage (Vo) is automatically adjusted to compensate for loop voltage drops in semiconductor voltage drops, sinewave filter voltage drop, isolation transformer primary and secondary leakage reactance and resistance voltage drops, DC rectifier voltage drops and final AC output filter resistive voltage drops leading up to the Cdc voltage feedback point. Fundamental inverter output voltage command ramp rate of Accel and Decel are AVAF input signal commands as onetime fixed input parameters corresponding to how fast the PWM inverter voltage is allowed to change to a step response from the DC load. Existing 12-pulse SCR technology presently has only an allowable 3-10 seconds voltage ramp rate due to inherent slow 12 pulse commutation delay that is not fast enough to compensate and poor non-linear control compensation to prevent wild current overshoots in the load. If too fast a ramp rate is applied to the extremely large 12 pulse $L_{dc}$ $C_{dc}$ filter time constant, the output may not be controllable but becomes a L-C oscillation circuit. In contrast, the disclosed topology eliminates this disadvantage and certain examples can correct for a full load resistive step load change quite quickly, for example, 0.1 seconds, which is at least 30× faster than existing 12 pulse SCR-based systems. In particular, the disclosed examples can compensate in one PWM cycle time period (e.g., 1/fc) and also the output AC ripple filter time constant is much smaller, since the AC ripple from the 18 or 24 pulse rectifier output requires small component values.

The AVAF control and inverter controller in certain examples of the converters 100 also provide a three phase output AC current limit regulator loop to primarily protect inverter capacitors, chokes and semiconductors from over-current and likewise insure downstream components are never overloaded past rated values or under short circuit conditions. The AVAF inputs an adjustable $I_{AC}$ Maximum Current Limit signal as a reference value and compares it in the PID control with three phase inverter output isolated current sensors. The highest individual phase current measured is used a feedback signal. The current regulator PID output error is used to limit the commanded Vo 3-phase inverter output voltage, thereby limiting the current to desired value. The controller can also implement an adjustable anode DC current limiting regulator loop that maintains DC load anode current to a desired maximum DC current value in each converter section 100. The anode current is measured and isolated with an isolated load Idc current feedback signal sent to the system controller for proper scaling. A customer anode DC current limit reference is likewise inputted to the system controller in FIG. 7. If the measured feedback DC anode current is greater than or equal to the anode DC current limit reference value, then the DC output voltage is folded back until the condition is satisfied. The system controller sends an automatic current limit foldback signal to the AVAF control which reduces AVAF Vcmd signal until maximum anode current is sustained.

Disclosed examples provide power conversion systems for AC/DC operation including a PWM Inverter 101 with AFAV Control to regulate an output DC load with minimization of the ripples in output DC Voltage. Certain examples advantageously provide DC output current feedback for current limiting and overload control, as well as the ability to adapt for different front end circuitry to mitigate input harmonics. Disclosed examples include inverter output sinewave filters 106 to convert PWM voltage in sinusoidal voltage waveform, as well as output phase-shifted isolation transformer is 107 to isolate the AC input line and the DC load to reduce ripple voltages. In addition, disclosed examples include multiphase diode Bridge rectifiers 109 to rectify the transformer secondary signals, as well as output DC Ripple filter's to provide low ripple voltage to the DC load for electroplating or other applications. Disclosed examples also provide the ability to control the DC bus voltage to a set point value, as well as the ability to regulate the ripple in the output DC voltage based on adjustable frequency control of the converter stage inverter circuits 101. The disclosed systems also accommodate step up or step down or unity turn's ratio for the isolation transformer 107 as needed for a given application. Furthermore, the use of ESS type multiphase isolation transformer's 107 facilitates reduction in common mode noise between the DC load and the input line, and disclosed examples provide small, low-cost packaging that can use low-voltage drives with suitable transformer step up or step down in order to implement a low ripple DC system to energize one or more electroplating anodes for other applications requiring a low ripple DC output voltage.

The following is claimed:

1. A system to apply a coating to a workpiece, comprising:
a tank at least partially filled with a solution, and extending along a process direction from an entry end to an exit end;
a plurality of tank anode structures mounted in distributed fashion along the process direction between the entry end and the exit end of the tank, the individual anode structures being electrically connected to the solution in the tank;

a plurality of power converter modules individually including a first output to provide a DC output signal to a corresponding one of the tank anode structures, the individual power converter modules including:

an adjustable voltage, adjustable frequency pulse width modulation (PWM) inverter to generate a first AC signal according to a desired fundamental inverter AC output frequency and a voltage reference, a sinewave filter, including an input to receive the first AC signal, and an output to provide a filtered AC signal, a multiphase isolation transformer, including a primary winding to receive the filtered AC signal, and a multiphase secondary to provide a plurality of isolated AC signals, a multi-pulse diode bridge rectifier, including a plurality of rectifier inputs to receive the plurality of isolated AC signals, and a rectifier output to provide a DC rectifier output signal, an output filter, including an input to receive the DC rectifier output signal, and an output to provide a filtered DC rectifier output signal, and a blocking diode, including an anode connected to the output of the output filter, and a cathode to provide the filtered DC rectifier output signal to the corresponding tank anode structure to promote formation of material on the workpiece travelling along the process direction between the entry end and the exit end.

2. The system of claim 1, wherein the PWM inverter regulates the filtered DC rectifier output signal by adjusting the first AC signal at least partially according to a feedback signal from the output filter.

3. The system of claim 1, wherein the PWM inverter provides the first AC signal at a signal frequency in a range of about 120 Hz to about 600 Hz.

4. The system of claim 3, wherein the PWM inverter provides the first AC signal at a signal frequency in a range of about 180 Hz to about 300 Hz.

5. The system of claim 3, wherein the PWM inverter provides the first AC signal at a signal frequency of about 180 Hz.

6. The system of claim 1, wherein the PWM inverter includes a six pulse inverter switching circuit, including three pairs of upper and lower switching devices individually coupled between a DC bus node and a corresponding one of three output nodes to provide the first AC signal as a three phase AC signal.

7. The system of claim 1, wherein the plurality of power converter modules operate according to a profile defining setpoints for the individual power converter modules.

8. The system of claim 1, wherein the multiphase isolation transformer is a six-phase transformer with an electrostatic shield connected to a ground.

9. The system of claim 1, wherein the multiphase isolation transformer is a nine-phase transformer with an electrostatic shield connected to a ground.

10. The system of claim 1, further comprising an input rectifier to provide a DC input signal to the PWM inverter.

11. A power converter to provide a DC output signal to an anode structure in an electroplating or painting system, comprising:

an adjustable voltage, adjustable frequency pulse width modulation (PWM) inverter to generate a first AC signal according to a desired fundamental inverter AC output frequency and a voltage reference;

a sinewave filter, including an input to receive the first AC signal, and an output to provide a filtered AC signal;

a multiphase isolation transformer, including a primary winding to receive the filtered AC signal, and a multiphase secondary to provide a plurality of isolated AC signals;

a multi-pulse diode bridge rectifier, including a plurality of rectifier inputs to receive the plurality of isolated AC signals, and a rectifier output to provide a DC rectifier output signal;

an output filter, including an input to receive the DC rectifier output signal, and an output to provide a filtered DC rectifier output signal; and a blocking diode, including an anode connected to the output of the output filter, and a cathode to provide the filtered DC rectifier output signal to a corresponding tank anode structure to promote formation of material on a workpiece travelling along a process direction between an entry end and an exit end.

12. The power converter of claim 11, wherein the PWM inverter regulates the filtered DC rectifier output signal by adjusting the first AC signal at least partially according to a feedback signal from the output filter.

13. The power converter of claim 11, wherein the PWM inverter provides the first AC signal at a signal frequency in a range of about 120 Hz to about 600 Hz.

14. The power converter of claim 13, wherein the PWM inverter provides the first AC signal at a signal frequency in a range of about 180 Hz to about 300 Hz.

15. The power converter of claim 13, wherein the PWM inverter provides the first AC signal at a signal frequency of about 180 Hz.

16. The power converter of claim 11, wherein the PWM inverter includes a six pulse inverter switching circuit, including three pairs of upper and lower switching devices individually coupled between a DC bus node and a corresponding one of three output nodes to provide the first AC signal as a three phase AC signal.

17. The power converter of claim 11, wherein the multiphase isolation transformer is a six-phase transformer with an electrostatic shield connected to a ground.

18. The power converter of claim 11, wherein the multiphase isolation transformer is a nine-phase transformer with an electrostatic shield connected to a ground.

19. The power converter of claim 11, further comprising an input rectifier to provide a DC input signal to the PWM inverter.

20. A method to apply a coating to a workpiece, comprising:

moving a workpiece through a solution in a tank along a process direction between an entry end and an exit end;

providing a DC voltage signal to each of a plurality of tank anode structures distributed in the solution along the process direction between the entry end and the exit end of the tank to promote formation of material on the workpiece; and generating the individual DC voltage signals according to a profile defining setpoints for the individual power converter modules, including for each tank anode structure:

generating a first AC signal at a frequency in a range of about 120 Hz to about 600 Hz using an adjustable voltage, adjustable frequency pulse width modulation (PWM) inverter according to a desired fundamental inverter AC output frequency and a voltage reference, filtering the first AC signal to generate a filtered AC signal using a sinewave filter, generating a plurality of isolated AC signals according to the filtered AC signal using a multiphase isolation transformer, rectifying the isolated AC signals to generate a DC rectifier output signal using a multi-pulse diode bridge rectifier, filtering the DC rectifier output signal to generate a filtered DC rectifier output signal using an output filter, and providing the filtered DC rectifier output to the tank anode structure through a blocking diode.

\* \* \* \* \*